(12) United States Patent
Cho et al.

(10) Patent No.: US 10,409,432 B2
(45) Date of Patent: Sep. 10, 2019

(54) TOUCH WINDOW

(71) Applicant: LG INNOTEK CO., LTD., Seoul (KR)

(72) Inventors: Sung Oh Cho, Seoul (KR); Seong Il Kweon, Seoul (KR); Dong Keon Lee, Seoul (KR); Woong Sic Kim, Seoul (KR); Ja Ram Kim, Seoul (KR); Dong Mug Seong, Seoul (KR); Suk Yong Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/568,352

(22) PCT Filed: Apr. 8, 2016

(86) PCT No.: PCT/KR2016/003740
§ 371 (c)(1),
(2) Date: Oct. 20, 2017

(87) PCT Pub. No.: WO2016/171421
PCT Pub. Date: Oct. 27, 2016

(65) Prior Publication Data
US 2018/0101258 A1    Apr. 12, 2018

(30) Foreign Application Priority Data

Apr. 24, 2015  (KR) .................. 10-2015-0057916
Jun. 26, 2015  (KR) .................. 10-2015-0091165
Jul. 17, 2015   (KR) .................. 10-2015-0101911

(51) Int. Cl.
*G06F 3/044* (2006.01)
*G06F 3/041* (2006.01)
*G06F 3/047* (2006.01)

(52) U.S. Cl.
CPC .............. *G06F 3/044* (2013.01); *G06F 3/041* (2013.01); *G06F 3/047* (2013.01); *G06F 2203/04112* (2013.01)

(58) Field of Classification Search
CPC .......... G06F 3/041; G06F 3/044; G06F 3/047; G06F 2203/04112
See application file for complete search history.

(56) References Cited

U.S. PATENT DOCUMENTS 9,639,219 B2    5/2017  Ishii et al.
2009/0214839 A1  8/2009  Kotsubo et al.
(Continued)

FOREIGN PATENT DOCUMENTS

EP    2 784 639    10/2014
JP      3193159     7/2001
(Continued)

OTHER PUBLICATIONS

International Search Report (with English Translation) and Written Opinion dated Aug. 9, 2016 issued in Application No. PCT/KR2016/003740.
(Continued)

*Primary Examiner* — Amare Mengistu
*Assistant Examiner* — Crystal Mathews
(74) *Attorney, Agent, or Firm* — KED & Associates, LLP

(57) ABSTRACT

A touch window according to an embodiment comprises: a substrate; a sensing electrode arranged on the substrate; and a reflection prevention layer arranged on the sensing electrode, wherein the reflection prevention layer comprises a first sub reflection prevention layer arranged on a first surface of the sensing electrode, a third sub reflection prevention layer arranged on a second surface, which lies opposite the first surface, and second sub reflection preven-
(Continued)

tion layers arranged on both side surfaces, which connect the first and second surfaces, respectively. In addition, a touch window according to an embodiment comprises: a substrate; a base member comprising a pattern portion arranged on the substrate; a sensing electrode arranged inside the pattern portion; and a reflection prevention layer surrounding the sensing electrode, wherein the reflection prevention layer comprises a first sub reflection prevention layer arranged on the lower surface of the sensing electrode, second sub reflection prevention layers arranged on both side surfaces of the sensing electrode, and a third sub reflection prevention layer arranged on the upper surface of the sensing electrode, and the second sub reflection prevention layers comprise inclined surfaces, respectively. In addition, a touch window according to an embodiment comprises: a substrate; a sensing electrode on the substrate; a first sub reflection prevention layer arranged on a first surface of the sensing electrode; and a third sub reflection prevention layer arranged on a second surface of the sensing electrode, wherein at least one of the sensing electrode, the first sub reflection prevention layer, and the third sub reflection prevention layer has a side surface inclined at an acute angle of inclination with regard to a surface of the substrate.

13 Claims, 19 Drawing Sheets

(56) References Cited

U.S. PATENT DOCUMENTS

| | | | | |
|---|---|---|---|---|
| 2012/0031746 | A1* | 2/2012 | Hwang | G06F 3/041 |
| | | | | 200/5 A |
| 2012/0318585 | A1* | 12/2012 | Kim | H05K 3/06 |
| | | | | 178/18.03 |
| 2014/0116863 | A1* | 5/2014 | Lee | G06F 3/041 |
| | | | | 200/279 |
| 2014/0118641 | A1 | 5/2014 | Ryu et al. | |
| 2014/0134328 | A1 | 5/2014 | Choi et al. | |
| 2014/0255667 | A1 | 9/2014 | Kim et al. | |
| 2014/0292714 | A1 | 10/2014 | Lee et al. | |
| 2015/0070309 | A1* | 3/2015 | Kang | G06F 3/044 |
| | | | | 345/174 |
| 2015/0084907 | A1* | 3/2015 | Burberry | G06F 3/046 |
| | | | | 345/174 |
| 2015/0177876 | A1 | 6/2015 | Ishii et al. | |
| 2015/0227239 | A1* | 8/2015 | Kim | G06F 3/044 |
| | | | | 345/174 |
| 2016/0117042 | A1* | 4/2016 | Ito | G06F 3/044 |
| | | | | 345/173 |
| 2016/0170549 | A1* | 6/2016 | Namkung | G06F 3/044 |
| | | | | 345/173 |
| 2016/0330835 | A1* | 11/2016 | Hirose | G06F 3/044 |
| 2017/0017335 | A1* | 1/2017 | Takahashi | G06F 3/044 |
| 2017/0371453 | A1* | 12/2017 | Nakayama | G06F 3/041 |
| 2018/0120971 | A1* | 5/2018 | Lee | G06F 3/044 |
| 2018/0246600 | A1* | 8/2018 | Ishii | G06F 3/044 |

FOREIGN PATENT DOCUMENTS

| | | |
|---|---|---|
| JP | 2012-079238 | 4/2012 |
| JP | 2014-016944 | 1/2014 |
| JP | 2014-150118 | 8/2014 |
| JP | 2015-025095 | 2/2015 |
| KR | 10-2009-0043544 | 5/2009 |
| KR | 10-2013-0105559 | 9/2013 |
| KR | 10-2013-0108220 | 10/2013 |
| KR | 10-2015-0014240 | 2/2015 |
| WO | WO 2014/010620 | 1/2014 |

OTHER PUBLICATIONS

Japanese Office Action dated Aug. 24, 2018 issued in Application No. 2017-555565.
European Search Report dated Oct. 2, 2018 issued in Application No. 16783355.7.

* cited by examiner

TOUCH WINDOW

CROSS-REFERENCE TO RELATED PATENT APPLICATIONS

This application is a U.S. National Stage Application under 35 U.S.C. § 371 of PCT Application No. PCT/KR2016/003740, filed Apr. 8, 2017, which claims priority to Korean Patent Application No. 10-2015-0057916, filed Apr. 24, 2015, Korean Patent Application No. 10-2015-0091165, filed Jun. 26, 2015, and Korean Patent Application No. 10-2015-0101911, filed Jul. 17, 2015, whose entire disclosures are hereby incorporated by reference.

TECHNICAL FIELD

In recent, touch windows are being applied to various electronics in a manner in which an input device such as a finger or stylus comes into contact with an image displayed on a display device to perform an input operation.

BACKGROUND ART

In such a touch window, a sensing electrode and a wired electrode connected to the sensing electrode are disposed on a substrate.

When an area on which the sensing electrode is disposed is touched, a variation in capacitance may be sensed to detect a position.

Indium tin oxide (ITO), which is most widely used as a transparent electrode of the touch window, is expensive and physically easily hit by bending and warpage of the substrate to deteriorate characteristics as an electrode. As a result, there is a problem that the ITO is not suitable for a flexible device. Also, when the ITO is applied to a large-sized touch panel, there is a problem that high resistance occurs.

To solve these problems, there are studies for replacing the ITO by forming an electrode material in a mesh shape.

Also, the sensing electrode may include a conductive material such as a metal. Such a metal has a problem that visibility of the touch window is deteriorated because light incident from the outside is seen from the outside due to unique shining characteristics of the metal.

Also, there is a problem that touch sensitivity is deteriorated due to corrosion of the electrode.

Also, when a first electrode is formed on an upper substrate, a second electrode is formed on a lower substrate, and the upper substrate and the lower substrate adhere to each other through an optically clear adhesive (OCA) or an optically clear resin (OCR), there are problems that the entire thickness of the touch window is thick, and process costs increase.

Thus, a touch window having a new structure that is capable of solving the above-described problems is required.

DISCLOSURE OF THE INVENTION

Technical Problem

Embodiments provide a touch window having improved reliability and visibility.

Technical Solution

A touch window according to an embodiment includes: a substrate; a sensing electrode disposed on the substrate; and a reflection prevention layer disposed on the sensing electrode, wherein the reflection prevention layer includes a first sub reflection prevention layer disposed on one surface of the sensing electrode, a third sub reflection prevention layer disposed on the other surface opposite to the one surface, and a second sub reflection prevention layer disposed on each of both side surfaces connecting the one surface to the other surface.

Also, a touch window according to an embodiment includes: a substrate; a base member disposed on the substrate and including a pattern part; a sensing electrode disposed in the pattern part; and a reflection prevention layer surrounding the sensing electrode, wherein the reflection prevention layer includes a first sub reflection prevention layer disposed on a bottom surface of the sensing electrode, a second sub reflection prevention layer disposed on each of both side surfaces of the sensing electrode, and a third sub reflection prevention layer disposed on a top surface of the sensing electrode.

Also, a touch window according to an embodiment includes: a substrate; a sensing electrode disposed on the substrate; a first sub reflection prevention layer disposed on one surface of the sensing electrode; and a third sub reflection prevention layer disposed on the other surface of the sensing electrode, wherein at least one side surface of the sensing electrode, the first sub reflection prevention layer, and the third sub reflection prevention layer is inclined at an acute angle with respect to one surface of the substrate.

Advantageous Effects

In the touch window according to the embodiments, the sensing electrode may be disposed to be surrounded by the reflection prevention layer to prevent the reliability from being deteriorated due to the corrosion of the top surface, the bottom surface, and both the side surfaces of the sensing electrode.

Also, the visibility may be prevented from being deteriorated due to the shining of the top surface, the bottom surface, and both the side surfaces of the sensing electrode.

Also, the sensing electrode may not come into direct contact with the substrate to prevent the sensing electrode from being delaminated. Thus, the reliability of the touch window may be improved.

Also, in the touch window according to the embodiments, the sensing electrode may be disposed with the uniform thickness within the pattern part, and the characteristics of the sensing electrode disposed in the pattern part may be uniform to improve the reliability of the touch window.

In the touch window according to the embodiments, the sensing electrodes may be disposed on one surface and the other surface of the substrate, respectively. That is, since the adhesion layer and one substrate are omitted to reduce the entire thickness of the touch window when compared with a structure in which the electrodes are respectively disposed on the separate substrates.

In the touch window according to the embodiments, since the side surface of at least one of the sensing electrode, the first sub reflection prevention layer, and the third sub reflection prevention layer is inclined at the acute angle with preset to one surface of the substrate, the reflection prevention layer having the inclination less than that of the sensing electrode may be disposed to face the user, thereby minimizing the reflection light reflected from the sensing electrode and improving the visibility of the touch window.

Also, at least one of the sensing electrode, the first sub reflection prevention layer, and the third sub reflection prevention layer may have a width that gradually increases toward the substrate. In addition, the sensing electrode, the first sub reflection prevention layer, and the third sub reflection prevention layer may be disposed on one surface of the substrate, and the other surface opposite to the one surface may be disposed to face the user, thereby minimizing the reflection light reflected from the sensing electrode and improving the visibility of the touch window.

MODE FOR CARRYING OUT THE INVENTION

Figure 1:
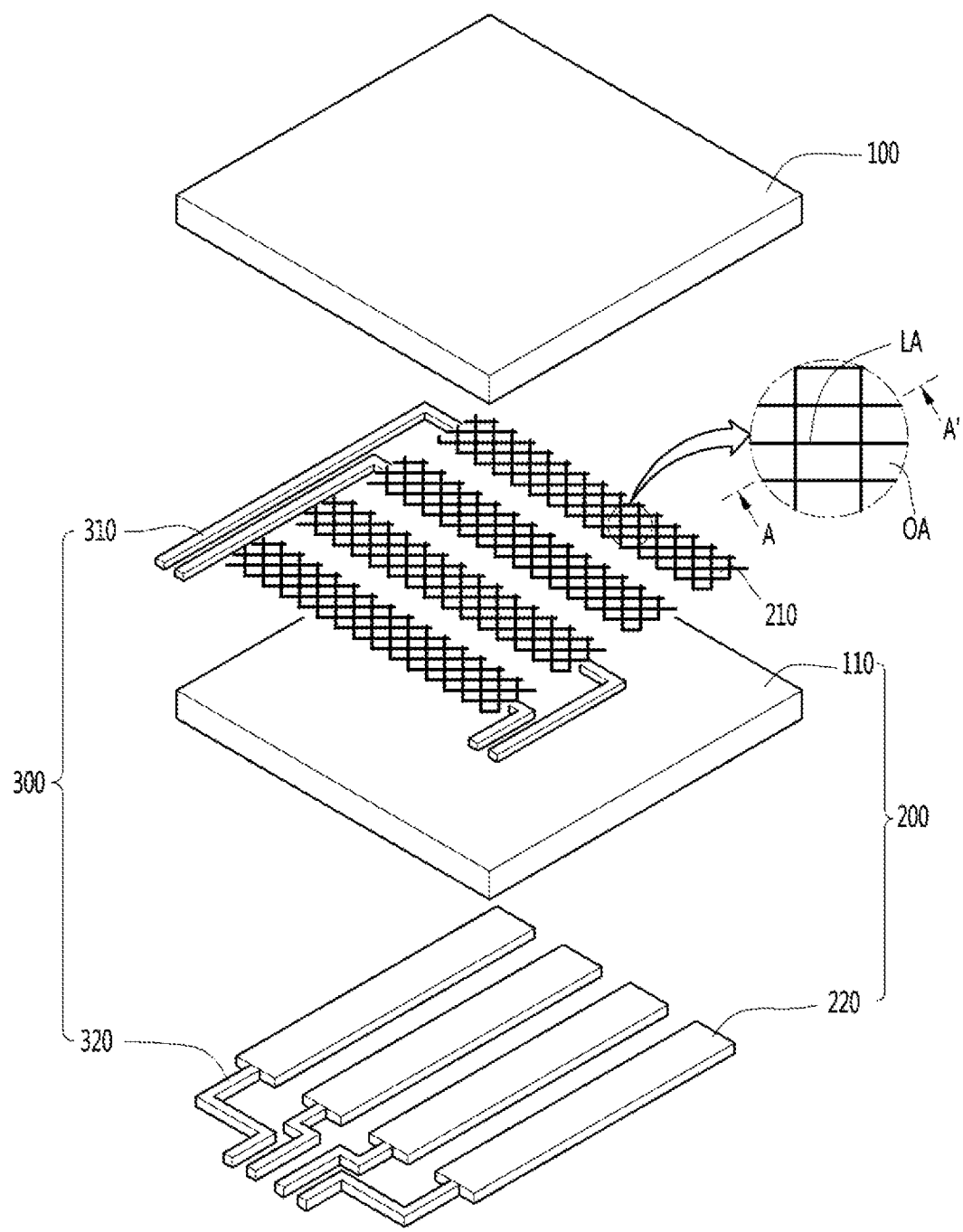
FIG. 1 is a perspective view of a touch window according to a first embodiment.

In the description of embodiments, it will be understood that when a layer (or film), area, pattern or structure is referred to as being 'on' or 'under' another layer (or film), region, pad or pattern, the terminology of 'on' and 'under' includes both the meanings of 'directly' and 'indirectly'. Further, the reference about 'on' and 'under' each layer will be made on the basis of drawings.

Also, when one part is referred to as being "connected" to another part, it should be understood that the former can be "directly connected" to the latter, or "indirectly connected" to the latter via an intervening member. Furthermore, when it is described that one "comprises (or includes or has)" some elements, it should be understood that it may comprise (or include or has) only those elements, or it may comprise (or include or have) other elements as well as those elements if there is no specific limitation.

In the drawings, the dimensions and size of each layer (or film), region, pattern or structure may be exaggerated, omitted, or schematically illustrated for convenience in description and clarity.

Hereinafter, exemplary embodiments will be described in detail with reference to the accompanying drawings.

Figure 6:
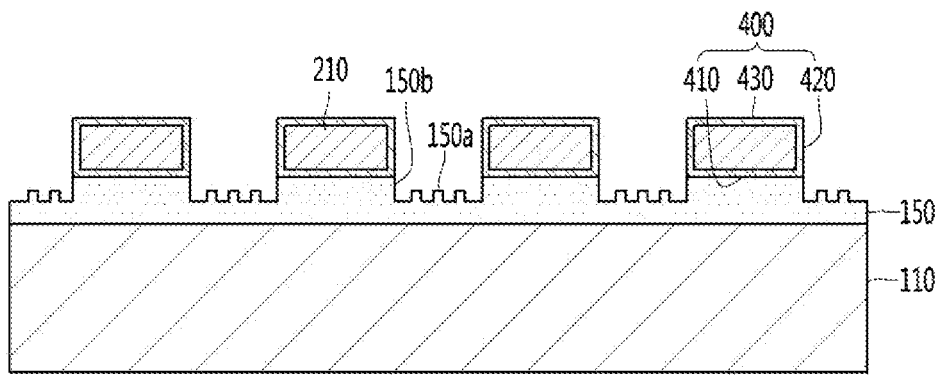

FIGS. 1 and 6 are views of a touch window according to a first embodiment.

Referring to FIG. 1, a touch window according to a first embodiment may include a cover substrate 100, a substrate 110, a sensing electrode 200, and a wired electrode 300.

The cover substrate 100 may be rigid or flexible.

For example, the cover substrate 100 may include glass or plastic.

In detail, the cover substrate 100 may include chemically reinforced or heat-strengthened glass such as soda lime glass or aluminosilicate glass, reinforced or flexible plastic such as polyimide (PI), polyethylene terephthalate (PET), propylene glycol (PPG), polycarbonate (PC), and the like, or sapphire.

Also, the cover substrate 100 may include an optically isotropic film. For example, the cover substrate 100 may include cyclic olefin copolymer (COC), a cyclic olefin polymer (COP), an optically isotropic polycarbonate (PC), or an optically isotropic polymethyl methacrylate (PMMA).

The sapphire has excellent electrical properties such as a dielectric constant, which not only significantly improves a touch response speed but all easily realizes spatial touch such as hovering and is applicable as a cover substrate because of its high surface strength. Here, the hovering represents a technique of recognizing coordinates even at a small distance from a display.

Also, the cover substrate 100 may be partially bent with a curved surface. That is, the cover substrate 100 may partially have a plane and may be partially bent with a curved surface. In detail, an end of the cover substrate 100 may be bent with a curved surface or be bent or curved with a surface having a random curvature.

Also, the cover substrate 100 may have a flexible substrate having a flexible property.

Also, the cover substrate 100 may be a curved or bent substrate. That is, the touch window including the cover substrate 100 may also have a flexible, curved, or bent property. Thus, the touch window according to an embodiment may be easily portable and variously changed in design.

The sensing electrode 200, the wired electrode 300, and a printed circuit board may be disposed on the cover substrate 100. That is, the cover substrate 100 may be a support substrate.

An available area and an unavailable area may be defined on the cover substrate 100.

A display may be displayed on the available area, and the display may not be displayed on the unavailable area disposed around the available area.

Also, a position of an input unit (e.g., a finger, a stylus, and the like) may be sensed on at least one area of the available area and the unavailable. As described above, when the input unit such as the finger, the stylus, and the like comes into contact with the touch window, a difference in capacitance may occur at the contact portion of the input unit. Thus, the portion at which the difference in capacitance occurs may be detected as a contact position.

The substrate 110 may be disposed on the cover substrate 100. The cover substrate 100 and the substrate 110 may adhere to each other through an adhesion layer. The substrate 110 may support the sensing electrode 200 and the wired electrode 300. That is, the substrate 110 may be support substrate supporting the sensing electrode 200 and the wired electrode 300.

That is, the sensing electrode 200, the wired electrode 300, and the printed circuit board may be supported by the substrate 110, and the substrate 110 and the cover substrate 100 may combined (adhere) with each other through the adhesion layer.

The substrate 110 may include a material that is equal or similar to that of the described-above cover substrate 100. Also, the substrate 110 may be bent like the cover substrate 100 and include a flexible substrate. Also, the substrate 110 may be a curved or bent substrate.

The sensing electrode 200 may be disposed on the substrate 110. In detail, the sensing electrode 200 may be disposed on at least one area of the available area and the unavailable area of the substrate 110. For example, the sensing electrode 200 may be disposed on the available area of the substrate.

The sensing electrode 200 may include a first sensing electrode 210 and a second sensing electrode 220.

The first sensing electrode 210 and the second sensing electrode 220 may be disposed on at least one surface of one surface and the other surface of the substrate 110. In detail, the first sensing electrode 210 and the second sensing electrode 220 may be disposed on one surface and the other surface of the substrate 110, respectively. That is, the first sensing electrode 210 may be disposed on the one surface of the substrate 210, and the second sensing electrode 220 may be disposed on the other surface of the substrate, which is opposite to the one surface.

The first sensing electrode 210 and the second sensing electrode 220 may extend in directions different from each other. For example, the first sensing electrode 210 may extend in one direction, and the second sensing electrode 220 may be extending in the other direction different from the one direction.

At least one sensing electrode of the first sensing electrode 210 and the second sensing electrode 220 may include a transparent conductive material to allow electricity to flow without interfering with transmission of light.

For example, the sensing electrode 200 may include metal oxide such as indium tin oxide, indium zinc oxide, copper oxide, tin oxide, zinc oxide, titanium oxide.

Alternatively, at least one sensing electrode of the first sensing electrode 210 and the second sensing electrode 220 may include a nanowire, a photosensitive nanowire film, carbon nanotube (CNT), grapheme, a conductive polymer, or a mixture thereof.

When nanocomposites such as the nanowire or carbon nanotube (CNT) are used, the nanocomposites may have a black color to control a color and reflectance while securing electrical conductivity through a control of a content of nanopowder.

Alternatively, at least one sensing electrode of the first sensing electrode 210 and the second sensing electrode 220 may include various metals. For example, the sensing electrode 200 may include at least one metal of Cr, Ni, Cu, Al, Ag, Mo, Au, Ti, and an alloy thereof.

For example, each of the first sensing electrode 210 and the second sensing electrode 220 may include a metal.

Also, the sensing electrode 200 may have a mesh shape. In detail, the sensing electrode 200 may include a plurality of sub electrodes. The sub electrodes may be disposed to cross each other and provided in the mesh shape.

For example, at least one sensing electrode of the first sensing electrode 210 and the second sensing electrode 220 may have the mesh shape. In detail, the first sensing electrode 210 disposed on one surface of the substrate 100 and/or the second sensing electrode 220 disposed on the other surface of the substrate 100 may have the mesh shape.

For example, the first sensing electrode 210 may have the mesh shape, and the second sensing electrode 220 may have a bar shape. However, the embodiment is not limited thereto. For example, all of the first sensing electrode 210 and the second sensing electrode 220 may have the mesh shape, or all of the first sensing electrode 210 and the second sensing electrode 220 may have the bar shape.

In detail, the sensing electrode may include mesh lines LA defined by the plurality of sub electrodes crossing each other in the mesh shape and a mesh opening OA between the mesh lines LA.

The mesh line LA may have a line width of about 0.1 μm to about 10 μm. It may be impossible to manufacture a mesh line part having a line width of the mesh line LA, which is less than about 0.1 μm, or the mesh line may be short-circuited. When the mesh line has a line width exceeding about 10 μm, an electrode pattern may be seen from the outside to deteriorate visibility. More preferably, the mesh line LA may have a line width of about 0.5 μm to about 7 μm. More preferably, the mesh line may have a line width of about 1 μm to about 3.5 μm.

Also, the mesh opening OA may have various shapes. For example, the mesh opening OA may have various shapes such as a rectangular shape, a diamond shape, a pentagonal shape, a hexagonal polygonal shape, or a circular shape. Also, the mesh opening may have a regular shape or a random shape.

Since the sensing electrode has the mesh shape, the pattern of the sensing electrode may not be seen on the available area, e.g., the display area. That is, even though the sensing electrode is made of the meal, the pattern may not be seen. Also, even though the sensing electrode is applied to the large-sized touch window, the touch window may be reduced in resistance.

The wired electrode 300 may be disposed on the substrate 110. In detail, the wired electrode 300 may be disposed to be connected to the sensing electrode 200 on the substrate 110.

The wired electrode 300 may be disposed on at least one area of the available area and the unavailable area of the substrate 110. For example, the wired electrode 300 may be disposed on the available area of the substrate 110.

The wired electrode 300 may include a first wired electrode 310 and a second wired electrode 320. For example, the wired electrode 300 may include a first wired electrode 310 connected to the first sensing electrode 210 and a second wired electrode 320 connected to the second sensing electrode 220.

Each of the first wired electrode 310 and the second wired electrode 320 may have one end connected to the sensing electrode 200 and the other end connected to the printed circuit board.

The wired electrode 300 may include a conductive material. For example, the wired electrode 300 may include a material that is equal or similar to that of the described above sensing electrode 200.

Also, the wired electrode 300 may have a mesh shape, like the above-described sensing electrode 200.

FIGS. 2 to 6 are cross-sectional views illustrating one surface of the sensing electrode of the touch window according to the first embodiment. Although the sensing electrode is illustrated in FIGS. 2 to 6, the wired electrode may be provided in the following description.

Referring to FIGS. 2 to 6, the sensing electrode 200 may be disposed on at least one surface of one surface and the other surface of the substrate 110. The sensing electrode 200 may include the first sensing electrode 210 and the second sensing electrode 220.

Figure 2:
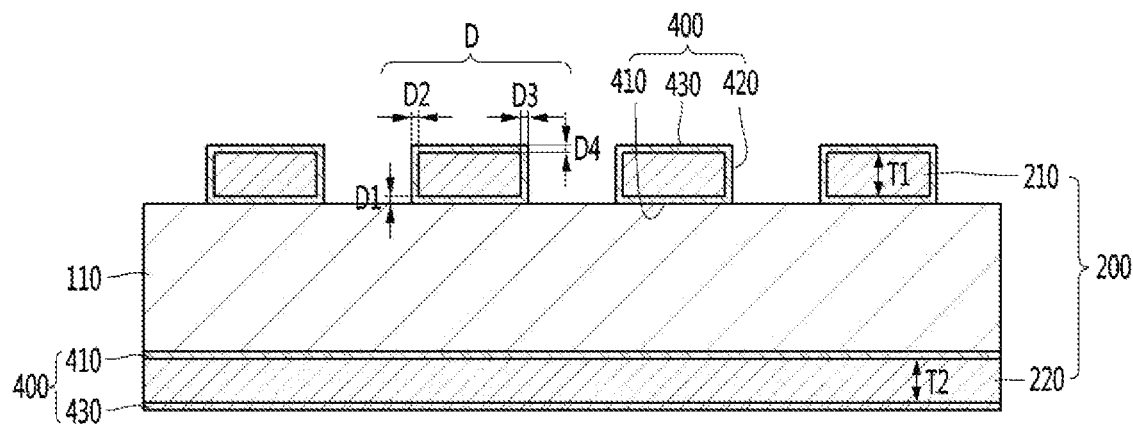
FIGS. 2 to 6 are cross-sectional views taken along line A-A' of FIG. 1.

Referring to FIG. 2, the sensing electrode may be disposed on each of the one surface and the other surface of the substrate 110.

The reflection prevention layer 400 may be disposed on the sensing electrode.

The reflection prevention layer 400 may be disposed on an entire surface of each of the first and second sensing electrodes 210 and 220. For example, the reflection prevention layer 400 may be disposed on at least two surfaces of each of the first and second sensing electrodes 210 and 220. For example, the reflection prevention layer 400 may be disposed on four surfaces of the first and second sensing electrodes 210 and 220. In detail, the reflection prevention layer 400 may be disposed on the top and bottom surfaces of the sensing electrode and the side surfaces that connect the top surface to the bottom surface. That is, the reflection prevention layer 400 may be disposed to surround the entire surface of the sensing electrode 200.

Referring to FIG. 2, the reflection prevention layer 400 may include a first sub reflection prevention layer 410, a second sub reflection prevention layer 420, and a third sub reflection prevention layer 430.

The first sub reflection prevention layer 410 may be disposed to come into contact with the sensing electrode 200 and the substrate 100. For example, the first sub reflection prevention layer 410 may be disposed to come into contact with one surface of the sensing electrode 200 and one surface of the substrate 100. In detail, the first sub reflection prevention layer 410 may be disposed between the sensing electrode 200 and the substrate 100.

The second sub reflection prevention layer 420 may be disposed to come into contact with the sensing electrode 200. For example, the second sub reflection prevention layer 420 may be disposed to come into contact with the side surfaces of the sensing electrode 200.

The third sub reflection prevention layer 430 may be disposed to come into contact with the sensing electrode 200. For example, the third sub reflection prevention layer 430 may be disposed to come into contact with the other surface that is opposite to the one surface of the sensing electrode 200.

Thus, the first sub reflection prevention layer 410, the second sub reflection prevention layer 420, and the third sub reflection prevention layer 430 may be connected to each other and disposed on the sensing electrode 200. In detail, the second sub reflection prevention layer 420 may connect the sub reflection prevention layer 410 disposed on the one surface of the sensing electrode 200 to the third sub reflection prevention layer 430 disposed on the other surface facing the one surface.

That is, the first sub reflection prevention layer 410, the second sub reflection prevention layer 420, and the third sub reflection prevention layer 430 may be disposed on the one surface, the other surface, and the side surfaces, i.e., the entire surface of the sensing electrode 200, respectively.

Also, the first sub reflection prevention layer 410, the second sub reflection prevention layer 420, and the third sub reflection prevention layer 430 may be disposed to be connected to each other. For example, the first sub reflection prevention layer 410, the second sub reflection prevention layer 420, and the third sub reflection prevention layer 430 may be integrally provided.

Thus, the first sub reflection prevention layer 410, the second sub reflection prevention layer 420, and the third sub reflection prevention layer 430 may be disposed to surround the entire surface of the sensing electrode 200.

In the touch window according to the first embodiment, the reflection prevention layer 400 may be disposed on the entire surface of the sensing electrode 200 to prevent the sensing electrode 200 from being oxidized or corroding by an external environment. That is, the reflection prevention layer may be disposed on the sensing electrode to serve as a protection layer, thereby protecting the sensing electrode against external impurities. Thus, the touch window according to the first embodiment may be improved in reliability.

Also, the sensing electrode 200 may be disposed on the reflection prevention layer 400 without coming into direct contact with the substrate 110, which is made of a material different from that of the sensing electrode 200, to prevent the sensing electrode 200 from being delaminated from the substrate 110. That is, the reflection prevention layer 400 may serve as a buffer layer between the substrate 110 and the sensing electrode 200 to improve attachment between the sensing electrode 200 and the substrate 110. Thus, the touch window according to the first embodiment may be improved in reliability.

For example, the first sensing electrode 210 and the second sensing electrode 220, which are disposed on the one surface and the other surface of the substrate 110, may be integrally provided.

For example, each of the first sensing electrode 210 and the second sensing electrode 220 may be a plated layer. For example, each of the first sensing electrode 210 and the second sensing electrode 220 may be integrally disposed on the substrate 110 through electroless plating. Here, the electroless plating may represent plating that is carried out without applying electrical energy to an aqueous solution from the outside. In detail, the first sensing electrode 210 and the second sensing electrode 220 may be formed at the same time through a wet process. Thus, the touch window according to the first embodiment may be improved in process efficiency.

Also, the sensing electrode 200 may have a thin thickness through the electroless plating. Thus, the touch window according to the first embodiment may be reduced in entire thickness.

The sensing electrode 200 may have a thickness T1 of about 200 nm to about 900 nm. For example, the sensing electrode 200 may have a thickness T1 of about 200 nm to about 700 nm. For example, the sensing electrode 200 may have a thickness T1 of about 200 nm to about 500 nm.

For example, when the sensing electrode 200 has a thickness T1 less than about 200 nm, the electrode may increase in resistance to deteriorate the reliability. Also, when the sensing electrode 200 has a thickness T1 exceeding about 900 nm, the entire thickness of the touch window may increase to deteriorate the process efficiency.

Also, the sensing electrode 200 may be disposed on the substrate 110 at the same thickness through the electroless plating. For example, the first sensing electrode 210 may have a thickness T1 corresponding to that T2 of the second sensing electrode 220. Thus, the touch window according to the first embodiment may be improved in reliability.

The reflection prevention layer 400 may have a thickness different from that of the sensing electrode 200. For example, the sensing electrode 200 may have a thickness greater than that of the reflection prevention layer 400.

For example, a ratio of the thickness of the reflection prevention layer 400 to the thickness of the sensing electrode 200 may be about 25:1 or less. For example, a ratio of the thickness of the reflection prevention layer 400 to the thickness of the sensing electrode 200 may range from about 18:1 to about 25:1. For example, a ratio of the thickness of the reflection prevention layer 400 to the thickness of the sensing electrode 200 may range from about 18:1 to 20:1. When a ratio of the thickness of the reflection prevention layer 400 to the thickness of the sensing electrode 200 exceeds about 25:1, the sensing electrode may be seen, and the attachment force between the sensing electrode and the substrate may be deteriorated.

Also, the reflection prevention layer 400 may be disposed on the sensing electrode 200 at the same thickness. For example, a thickness D1 of the first sub reflection prevention layer 410, thicknesses D2 and D3 of the second sub reflection prevention layer 420, and a thickness D4 of the third sub reflection prevention layer 430 may correspond to each other. Thus, the touch window according to the first embodiment may be improved in reliability.

The reflection prevention layer 400 may have a thickness D of about 10 μm to about 50 μm. For example, the reflection prevention layer 400 may have a thickness D of about 10 μm to about 30 μm. For example, the reflection prevention layer 400 may have a thickness D of about 10 μm to about 20 μm.

When the reflection prevention layer 400 has a thickness D less than about 10 μm, the sensing electrode 200 may be seen.

Also, when the reflection prevention layer 400 has a thickness D exceeding about 50 μm, the entire thickness of the touch window may increase to deteriorate the process efficiency.

Here, the thickness D of the reflection prevention layer 400 may represent a mean thickness of the thickness D1 of the first sub reflection prevention layer 410, the thicknesses D2 and D3 of the second sub reflection prevention layer 420, and the thickness D4 of the third sub reflection prevention layer 430.

The sensing electrode 200 may include a material corresponding to that of the reflection prevention layer 400. For example, the sensing electrode 200 may include a metal corresponding to that of the reflection prevention layer 400. For example, the reflection prevention layer 400 may include metal oxide. In detail, the sensing electrode 200 may include a metal, and the reflection prevention layer 400 may include oxide including the metal, i.e., metal oxide. In detail, the sensing electrode 200 may include a first metal, and the reflection prevention layer 400 may include oxide including the first metal, i.e., first metal oxide.

However, this embodiment is not limited thereto. For example, the sensing electrode 200 may include a material different from that of the reflection prevention layer 400. The reflection prevention layer 400 may include an alloy. For example, the reflection prevention layer 400 may include at least one compound of $Cu_2Se$ and Cu—Pd. For example, the sensing electrode 200 may be separately formed with respect to the reflection prevention layer 400.

The reflection prevention layer 400 may have a predetermined color.

The reflection prevention layer 400 may have a lightness index L* of about 40 or less. For example, the reflection prevention layer 400 may have a lightness index L* of about 0 to about 40. For example, the reflection prevention layer 400 may have a lightness index L* of about 10 to about 40. When the reflection prevention layer 400 has a lightness index L* less than about 40, the sensing electrode 200 may be prevented from being seen from the outside. The lightness index L* may be a numerical value representing brightness. That is, as the lightness index L* is closer to 100, a white color is represented, and as the lightness index L* is closer to 0, a black color is represented.

A chromaticity index b* of the reflection prevention layer 400 may have a negative value. For example, the reflection prevention layer 400 may have a lightness index b* of −10 or less. For example, the reflection prevention layer 400 may have a chromaticity index b* of −15 or less. When the chromaticity index b* of the reflection prevention layer 400 has a negative value, the sensing electrode 200 may be prevented from being seen from the outside. The chromaticity index b* may be a unit of a color coordinate system. When the chromaticity index has a negative value, a blue color may be represented, and when the chromaticity index has a positive value, a yellow color may be represented. Also, the blue or yellow color may be enhanced according to the value of the chromaticity index.

For example, the reflection prevention layer 400 may have a black-based color. In detail, the reflection prevention layer 400 may have at least one color of a black color, a gray color, and a mixed color thereof.

For example, the reflection prevention layer 400 may be made of a blackening material. The blackening material may be metal oxide having a black color. For example, one material selected from CuO, CrO, FeO, and $Ni_2O_3$ may be applied to the blackening material, but is not limited thereto. For example, a black-based material that is capable of suppressing the reflectivity of the sensing electrode 200 may be applied.

That is, the reflection prevention layer 400 may prevent reflection of the sensing electrode 200. In detail, the top, bottom, and side surfaces of the sensing electrode 200 may be prevented from being seen due to shining thereof.

For example, the reflection prevention layer 400 may be formed through a wet process, like the sensing electrode. Accordingly, the process efficiency may be improved.

Although the sensing electrode 200 is provided in the rectangular shape in FIG. 2, this embodiment is not limited thereto. For example, the sensing electrode 200 may be inclined or have a curved surface.

Figure 3:
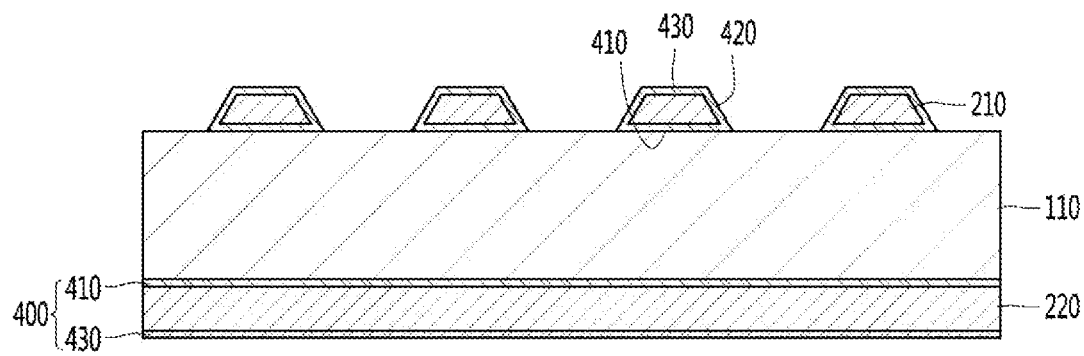

Referring to FIG. 3, the sensing electrode 200 may have an inclined surface. For example, the inclined surface may have a width that gradually decreases from one surface on which the sensing electrode 200 comes into contact with the substrate 100 toward the other surface opposite to the one surface. In detail, the inclined surface may be a linear shape or a shape similar to the linear shape.

Also, the reflection prevention layer 400 may be disposed on the entire surface of the sensing electrode 200. That is, the first sub reflection prevention layer 410, the second sub reflection prevention layer 420, and the third sub reflection prevention layer 430 may be disposed on the entire surface of the sensing electrode 200 having the inclined surface. Thus, the second sub reflection prevention layer 420 may be inclined at an acute angle with respect to the substrate 110 to connect the first sub reflection prevention layer 410 to the third reflection prevention layer 430.

Figure 4:
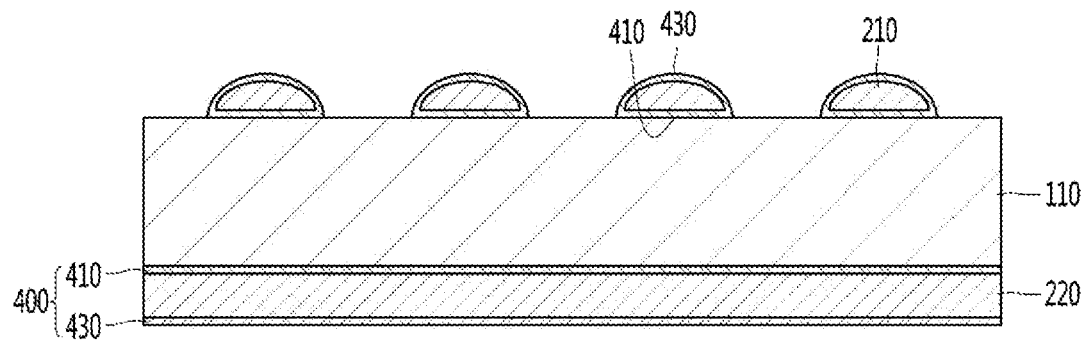

Referring to FIG. 4, the sensing electrode 200 may have an inclined surface. For example, the sensing electrode 200 may have one surface coming into contact with the substrate 110 and the outer surface opposite to the one surface. Here, the other surface may have a curved surface.

Also, the reflection prevention layer 400 may be disposed on the entire surface of the sensing electrode 200. That is, the first sub reflection prevention layer 410 may be disposed between the substrate 110 and the one surface of the sensing electrode 200, and the third sub reflection prevention layer 430 may have a curved surface and be disposed on the other surface of the sensing electrode 200. The first sub reflection prevention layer 410 may be connected to the third sub reflection prevention layer 430.

Although the sensing electrode 210 is disposed on the substrate in FIGS. 2 to 4, this embodiment is not limited thereto. For example, the sensing electrode 210 may be disposed in the pattern part.

Figure 5:
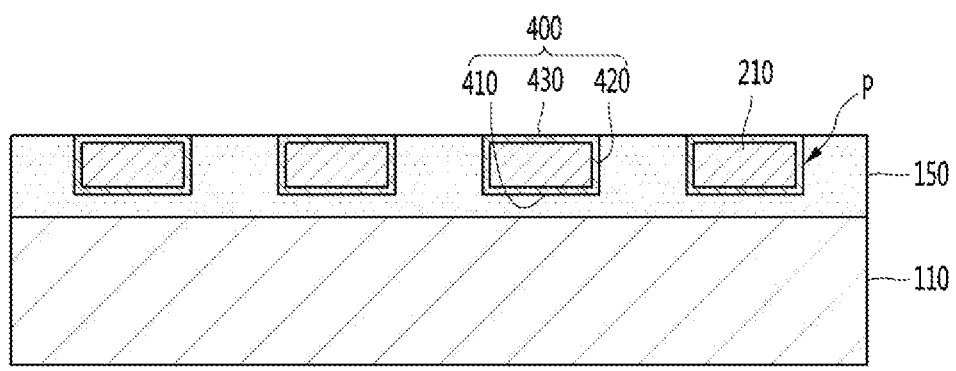

Referring to FIGS. 5 and 6, a base member 150 may be further disposed on the substrate 100. For example, the base member 150 may be disposed on the one surface or the other surface of the substrate 100, and a plurality of engraved pattern parts P may be disposed on the base member 150. The pattern parts P may have a mesh shape as a whole.

The base member 150 may include a photocurable resin or a thermosetting resin, but this embodiment is not limited thereto. Also, the engraved pattern of the base member 150 may be formed by imprinting an embossed pattern having a shape that is complementary to the engraved pattern.

Referring to FIG. 5, the sensing electrode 200 and the reflection prevention layer 400 disposed to surround the entire surface of the sensing electrode 200 may be disposed in the engraved pattern part P of the base member 150.

The sensing electrode according to an embodiment may be formed by filling a conductive material in the engraved pattern after the base member 150 including the photocurable resin (UV resin) or the thermosetting resin are formed and after the engraved pattern having the mesh shape is formed on the base member. Here, the engraved pattern of the base member 150 may be formed by imprinting a mold having the embossed pattern.

Referring to FIG. 6, the base member 150 on which patterns having sizes different from each other are formed may be disposed on the substrate 100.

The base member 150 may include a first pattern 150*a* and a second pattern 150*b*. In detail, the base member 150 may include a first pattern 150*a* and a second pattern 150*b*, which have widths different from each other. Also, each of the first pattern 150*a* and the second pattern 150*b* may be an embossed pattern. Also, the first pattern 150*a* may have a width of several nanometers (nm), and the second pattern 150*b* may have a width of several micrometers (μm). That is, the second pattern 150*b* may have a width greater than that of the first pattern 150*a*.

Each of the first pattern 150*a* and the second pattern 150*b* may be formed by imprinting a mold having an engraved pattern having a shape that is complementary to the embossed pattern.

The sensing electrode 200 and the reflection prevention layer 400 may be disposed on the second pattern 150*b*.

Hereinafter, a touch window according to a second embodiment will be described with reference to FIGS. 7 to 9. Here, descriptions duplicated with those of the foregoing first embodiment will be omitted. The same constituent will be given by the same reference numeral.

Figure 7:
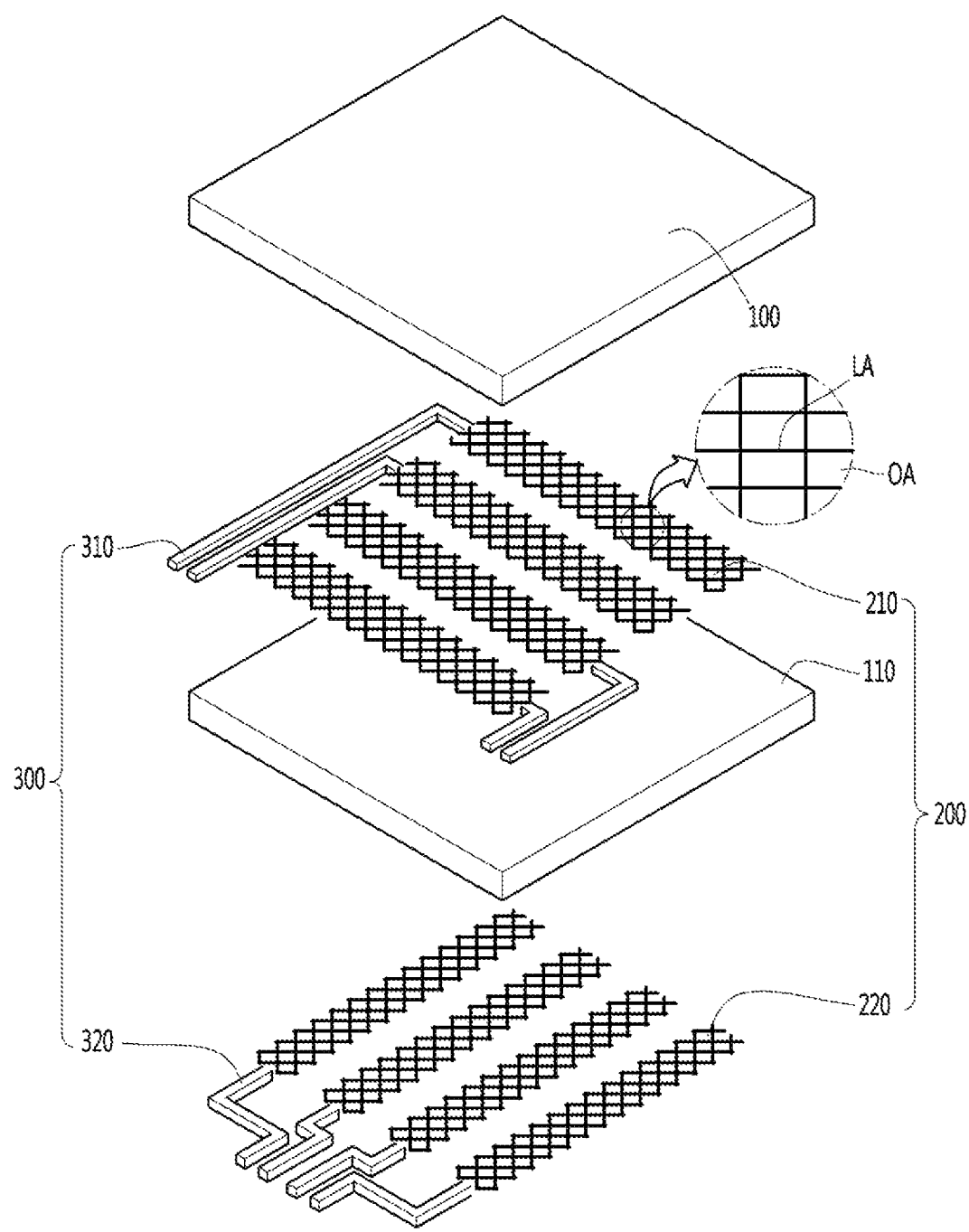
FIG. 7 is a perspective view of a touch window according to a second embodiment.

Referring to FIG. 7, in a touch window according to a second embodiment, a first sensing electrode 210 and a second sensing electrode 220 may be respectively disposed on one surface and the other surface of a substrate 110, i.e., both surfaces of the substrate 110. Thus, since all of the first sensing electrode 210 and the second sensing electrode 220 are disposed on one substrate 110, the touch window may be reduced in entire thickness.

That is, in the touch window according to this embodiment, since an adhesion layer and one substrate are omitted to reduce the entire thickness of the touch window when compared with a structure in which sensing electrodes 210 are respectively disposed on the separate substrates.

Each of the first and second electrodes 210 and 220 disposed on both surfaces of the substrate 110, i.e., each of the first sensing electrode 210 disposed on one surface of the substrate 110 and/or the second sensing electrode 220 disposed on the other surface of the substrate 110 may have a mesh shape.

A mesh line LA may have a line width of about 0.1 μm to about 10 μm. Preferably, the mesh line LA may have a line width of about 0.5 μm to about 7 μm. More preferably, the mesh line may have a line width of about 1 μm to about 3.5 μm.

Also, the mesh line LA may have a thickness of about 100 nm to about 500 nm. When the mesh line LA has a thickness less than about 100 nm, electrode resistance may increase to deteriorate an electrical property. When the mesh line LA has a thickness greater than about 500 nm, the touch window may increase in entire thickness to deteriorate process efficiency. Preferably, the mesh line LA may have a thickness of about 150 nm to about 200 nm. More preferably, the mesh line LA may have a thickness of about 180 nm to about 200 nm.

Although not shown in the drawings, a deco layer may be disposed on an unavailable area of the substrate. The deco layer may be disposed on the unavailable area of the substrate and formed by applying a material having a predetermined color so that a wired electrode and a printed circuit board connecting the wired electrode to an external circuit are not seen from the outside.

The deco layer may have a color that is suitable for a desired outer appearance, for example, a black or white color including a black or white pigment. Alternatively, the deco layer may have various colors such as a red color and a blue color by using various color films.

When the deco layer is provided as a film, the deco layer may be easily disposed when the deco layer is disposed on a cured or flexible substrate.

Also, a desired logo may be formed on the deco layer through the deco layer. The deco layer may be formed through deposition, printing, and wet coating.

The deco layer may be provided with at least one layer. For example, the deco layer may be provided as one layer or two layers having widths different from each other.

The deco layer may be disposed on at least one surface of the one surface and the other surface of the substrate.

Figure 8:
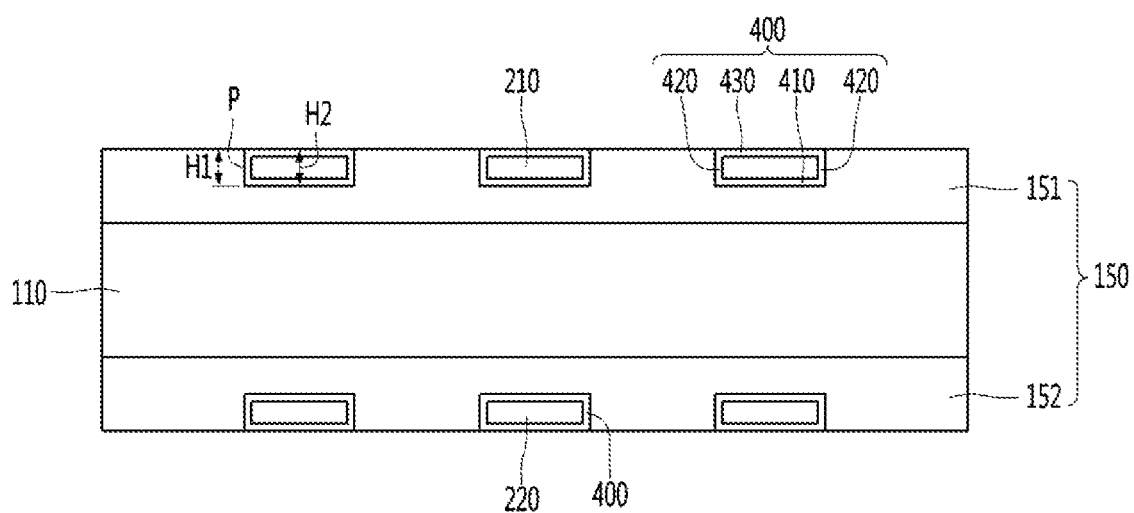
FIG. 8 is a cross-sectional view of the touch window according to the second embodiment.

Referring to FIG. 8, the touch window according to the second embodiment may include a base member 150 on the substrate 110 and a sensing electrode 200 on the base member 150.

The base member 150 may include plastic. For example, the base member 150 may include a resin. For example, the base member 150 may include a photocurable resin or a thermosetting resin such as an UV resin.

The base member 150 may include a pattern part P.

For example, an engraved pattern part P may be disposed on each of one surface and the other surface of the base member 150. The pattern part P may have a mesh shape. In detail, the pattern part P may have a mesh shape crossing each other.

The sensing electrode 200 may be disposed on the base member 150. For example, the sensing electrode 200 may be disposed in the pattern part P. Thus, the sensing electrode 200 may be disposed on the base member 150 in the mesh shape.

For example, a first base member 151 may be disposed on the one surface of the substrate 110, the first sensing electrode 210 may be disposed in the pattern part P of the first base member 151, a second base member may be disposed on the other surface of the substrate 110, and the second sensing electrode 220 may be disposed in the pattern part P of the second base member 152.

The sensing electrode may include the above-described conductive material. For example, the sensing electrode may be formed by filling conductive paste including the conductive material into the pattern part.

The conductive paste may be formed by mixing conductive powder, a solvent, and a binder with each other.

The conductive powder may include the above-described metal. That is, the conductive powder may be metal powder including at least one metal of Cr, Ni, Cu, Al, Ag, Mo, Au, Ti, and an alloy thereof.

The binder may serve to give adhesion force between the metal powder and the substrate. For example, the binder may include at least one selected from the group consisting of epoxy, ester, acryl, and vinyl, but is not limited thereto.

Also, the solvent may include an organic solvent that is capable of dissolving the binder. For example, the solvent may include at least one selected from group consisting of alcohols, glycols, polyols, ethers, glycol ethers, glycol ether esters, and esters, but is not limited thereto.

After the conductive paste is applied to the base member 150, the conductive paste may be filled in the pattern part of the base member by using a rolling member.

Thus, the conductive paste may be filled into the pattern part P to form the sensing electrode 200 having the mesh shape as a whole.

Alternatively, the sensing electrode 200 may be deposited in the pattern part through electroplating or electroless plating. When the sensing electrode 200 is directly deposited through the electroplating or the electroless plating, a metal having superior electrical property than the paste may be deposited on the base member 150. Thus, the sensing electrode 200 may be deposited at a thin thickness to reduce a thickness of the electrode.

Also, since the sensing electrode 200 is deposited through the electroplating or the electroless plating, the electrode may be deposited at a more uniform thickness in the pattern part when compared with a case in which the paste is applied. Thus, the touch window according to this embodiment may be improved in reliability.

The reflection prevention layer 400 may be disposed on the sensing electrode 200. For example, the reflection prevention layer 400 may be disposed on each of the first sensing electrode 210 and the second sensing electrode 220.

The reflection prevention layer 400 may be disposed to come into contact with the sensing electrode 200. For example, the reflection prevention layer 400 may be disposed to come into direct contact with the sensing electrode 200.

The reflection prevention layer 400 may be disposed on an entire surface of the sensing electrode 200. For example, when the sensing electrode 200 has top, bottom, left, and right surfaces, the reflection prevention layer 400 may be disposed on an entire surface of the top, bottom, left, and right surfaces of the sensing electrode 200.

That is, the sensing electrode 200 may be disposed to surround the reflection prevention layer 400. Thus, the sensing electrode 200 and the reflection prevention layer 400 disposed to surround the sensing electrode 200 may be disposed in the pattern part P.

The reflection prevention layer 400 may include a first sub reflection prevention layer 410 disposed on the bottom surface of the sensing electrode 200, a second sub reflection prevention layer 420 disposed on each of both side surfaces of the sensing electrode 200, and a third sub reflection prevention layer 430 disposed on the top surface of the sensing electrode 200.

The first sub reflection prevention layer 410, the second sub reflection prevention layer 420, and the third sub reflection prevention layer 430 may be integrally provided.

Also, the first sub reflection prevention layer 410, the second sub reflection prevention layer 420, and the third sub reflection prevention layer 430 may be formed at the same time.

Alternatively, the first sub reflection prevention layer 410 and the second sub reflection prevention layer 420 may be formed at the same time, and the sensing electrode 200 is formed on the first sub reflection prevention layer 410 and the second sub reflection prevention layer 420. Then, the third sub reflection prevention layer 430 may be formed.

For example, the base member 150 disposed on the substrate 110 may increase in illuminance through surface treatment. The base member 150 may be treated by using an organic solvent including a metal. For example, the base member 150 may be treated by using an organic solvent including Pd or Ag. Then, the metal contained in the organic solvent may be reduced to form the first sub reflection prevention layer 410 and the second sub reflection prevention layer 420. Here, each of the first sub reflection prevention layer 410 and the second sub reflection prevention layer 420 may be a blackening layer. As the illuminance of the surface of the base member 150 increases, attachment of the metal such as Pd or Ag may increase, and thus, the blackening layer may be formed to be excellent. Next, the sensing electrode may be formed. The third sub reflection prevention layer 430 disposed on the sensing electrode 200 may be formed by oxidizing the surface of the sensing electrode 200 or by being treated using the same formation method as that for forming the first sub reflection prevention layer 410 and the second sub reflection prevention layer 420.

Also, the first sub reflection prevention layer 410, the second sub reflection prevention layer 420, and the third sub reflection prevention layer 430 may include the same material or materials similar to each other. That is, the first sub reflection prevention layer 410, the second sub reflection prevention layer 420, and the third sub reflection prevention layer 430 may include materials corresponding to each other.

Also, the first sub reflection prevention layer 410, the second sub reflection prevention layer 420, and the third sub reflection prevention layer 430 may be disposed at the same thickness or at thicknesses similar to each other.

The reflection prevention layer 400 may be disposed on the sensing electrode 200 through the electroplating or the electroless plating. When the reflection prevention layer 400 is deposited through the electroplating or the electroless plating, the reflection prevention layer may be deposited in the pattern part at a uniform thickness. That is, the reflection prevention layer 400 may be a plated layer. In detail, each of the first sub reflection prevention layer 410, the second sub reflection prevention layer 420, and the third sub reflection prevention layer 430 may be a plated layer.

The first sub reflection prevention layer 410 may be disposed between the base member 150 and the sensing electrode 200 to improve attachment between the sensing electrode 200 and the base member 120. Thus, delamination or separation of the sensing electrode 200 may be prevented to improve the reliability of the touch window.

Also, the reflection prevention layer 400 may be disposed on the sensing electrode 200 to serve as a protection layer of the sensing electrode 200. For example, the reflection prevention layer 400 may prevent the top, bottom, or both the side surfaces of the sensing electrode from being oxidized or corroding due to exposure thereof to the outside to improve the reliability of the touch window.

Since the reflection prevention layer 400 is disposed in the pattern part P, the third sub reflection prevention layer 430 may have a width corresponding to that of the first sub reflection prevention layer 410. However, this embodiment is not limited thereto. For example, the pattern part P may be formed with various engraved patterns.

The reflection prevention layer 400 may include a metal. In detail, the reflection prevention layer 400 may include a metal such as Cu2Se, Pd, Ag, or Nb.

For example, the reflection prevention layer 400 may include metal oxide. In detail, the reflection prevention layer 400 may include metal oxide such as CuO, CrO, FeO, or $Ni_2O_3$. However, this embodiment is not limited thereto. For example, the reflection prevention layer 400 may include various metals or metal oxides, which are capable of suppressing the reflectivity of the sensing electrode.

That is, the reflection prevention layer 400 may be disposed on the sensing electrode 200 to improve visibility of the sensing electrode 200. For example, the first sub reflection prevention layer 410 may be disposed on the bottom surface of the sensing electrode 200, the second sub reflection prevention layer 420 may be disposed on each of both the side surfaces of the sensing electrode 200, and the third sub reflection prevention layer 430 may be disposed on the top surface of the sensing electrode 200 to prevent the visibility from being deteriorated by the shining of the top, bottom, or both side surfaces of the sensing electrode.

The reflection prevention layer 400 may include a color. For example, the reflection prevention layer 400 may have a black-based color. In detail, the reflection prevention layer 400 may have at least one color of a black color, a gray color, and a mixed color thereof.

The reflection prevention layer 400 and the sensing electrode 200 may be formed at the same time or formed through separate processes.

The sensing electrode 200 may have a thickness different from that of the reflection prevention layer. For example, the sensing electrode 200 may have a thickness greater than that of the reflection prevention layer. For example, when the reflection prevention layer has a thickness greater than that of the sensing electrode 200, the touch window according to an embodiment may be deteriorated in electrical property.

The second sub reflection prevention layer 420 may have an inclination corresponding to a side surface of the pattern part P of the base member 150. That is, the second sub reflection prevention layer 420 may have an interior angle of 90 degrees, which is connected to the first sub reflection prevention layer 410 disposed on the bottom surface of the sensing electrode 200, and an interior angle of 90 degrees, which is connected to the third sub reflection prevention layer 430 disposed on the top surface of the sensing electrode. Thus, the second sub reflection prevention layers 420 facing each other may be disposed parallel to each other with the sensing electrode 200 therebetween.

The pattern part P may have a height H1 corresponding to that H2 of each of the sensing electrode 200 and the reflection prevention layer 400, which are disposed in the pattern part P.

Figure 9:
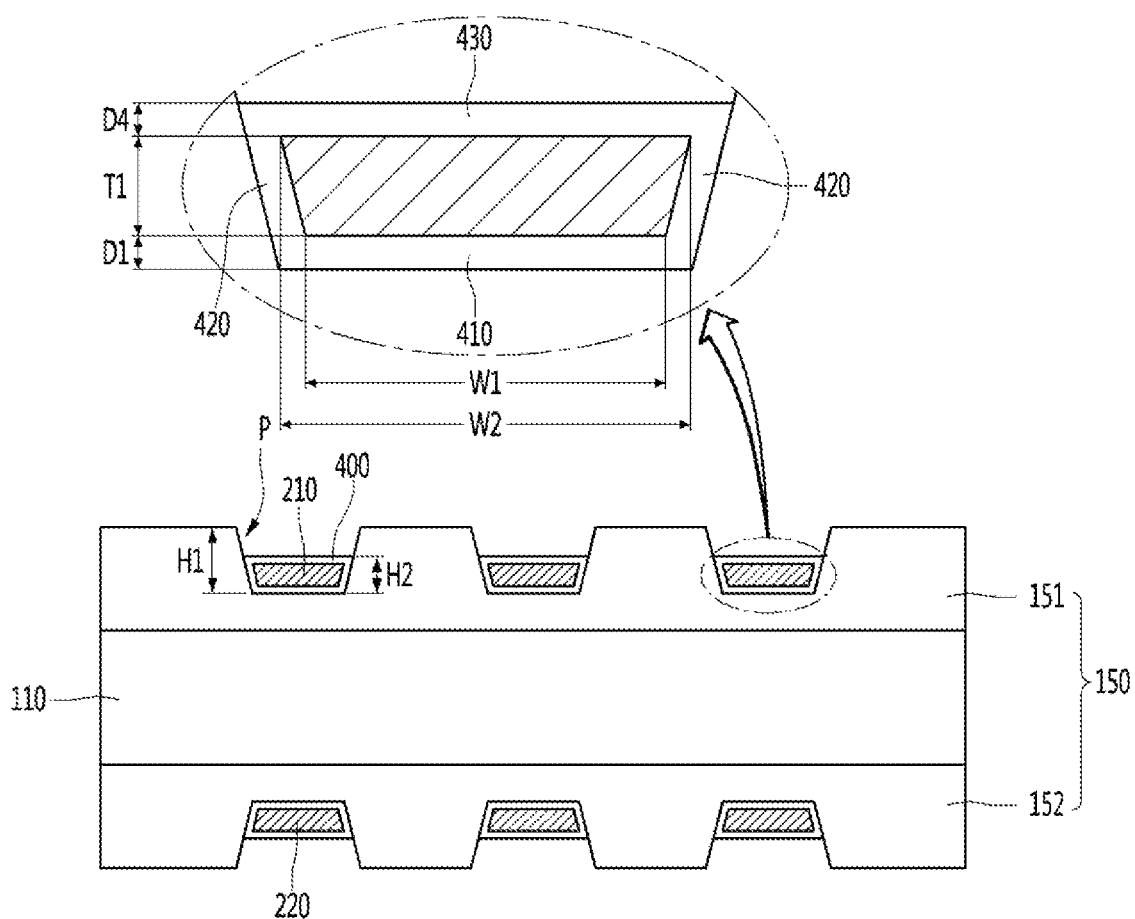
FIG. 9 is another cross-sectional view of the touch window according to the second embodiment.

Referring to FIG. 9, a side surface of the pattern part P of the base member 150 may include an inclined surface. Thus, the bottom and top surfaces of the sensing electrode 200 may have widths different from each other.

For example, the sensing electrode 200 may have a width that gradually increases from the bottom surface coming into contact with the base member 150 toward the top surface opposite to the bottom surface. In detail, the bottom of the sensing electrode, which comes into contact with the base member, may have a width W1 less than that W2 of the top surface opposite to the bottom surface. In more detail, the sensing electrode 200 may have a width that gradually decrease toward the substrate, i.e., closer to the substrate.

That is, since the reflection prevention layer 400 is disposed in the pattern part P, the third sub reflection prevention layer 430 may have a width different from that of the first sub reflection prevention layer 410. For example, the third sub reflection prevention layer 430 may have a width greater than that of the first sub reflection prevention layer 410. Thus, the . . . . Thus, delamination or separation of the sensing electrode 200 may be prevented to improve the reliability of the touch window.

The second sub reflection prevention layer 420 may have an inclination corresponding to that of the side surface of the base member 150. That is, the second sub reflection prevention layer 420 may have an obtuse angle exceeding 90 degrees, which is connected to the first sub reflection prevention layer 410 disposed on the bottom surface of the sensing electrode 200, and an obtuse angle exceeding 90 degrees, which is connected to the third sub reflection prevention layer 430 disposed on the top surface of the sensing electrode. Thus, a spaced distance between the second sub reflection prevention layers 420 facing each other may decrease from the top surface toward the bottom surface of the sensing electrode 200.

The sensing electrode 200 may have a thickness T1 different from that of the reflection prevention layer. For example, the sensing electrode 200 may have a thickness T1 greater than that of the reflection prevention layer. In detail, the sensing electrode 200 may have a thickness T1 greater than that D1 of the first sub reflection prevention layer 410. In detail, the sensing electrode 200 may have a thickness T1 greater than that D4 of the third sub reflection prevention layer 430.

Thus, the electrical property of the sensing electrode 200 may be secured, and simultaneously, the sensing electrode 200 may be prevented from being seen.

The pattern part P may have a height H1 greater than that H2 of each of the sensing electrode 200 and the reflection prevention layer 400, which are disposed in the pattern part P. Thus, the delamination of the sensing electrode 200 may be prevented, and the damage of the third sub reflection prevention layer 430 may be prevented to improve the protection effect of the sensing electrode 200 by the reflection prevention layer 400.

In the touch window according to an embodiment, since the touch electrode is disposed on the one surface and the other surface of the substrate, the touch window may be reduced in thickness. Also, since the sensing electrode is disposed to surround the reflection prevention layer, the reliability and the visibility may be improved. Also, in the touch window according to an embodiment, since the touch electrode disposed on the one surface and the other surface of the substrate and the reflection prevention layer surrounding the sensing electrode are formed at the same time, the process efficiency may be improved.

Hereinafter, a touch window according to a third embodiment will be described with reference to FIGS. 10 to 16. Here, descriptions duplicated with those of the foregoing first embodiment will be omitted. The same constituent will be given by the same reference numeral.

Figure 10:
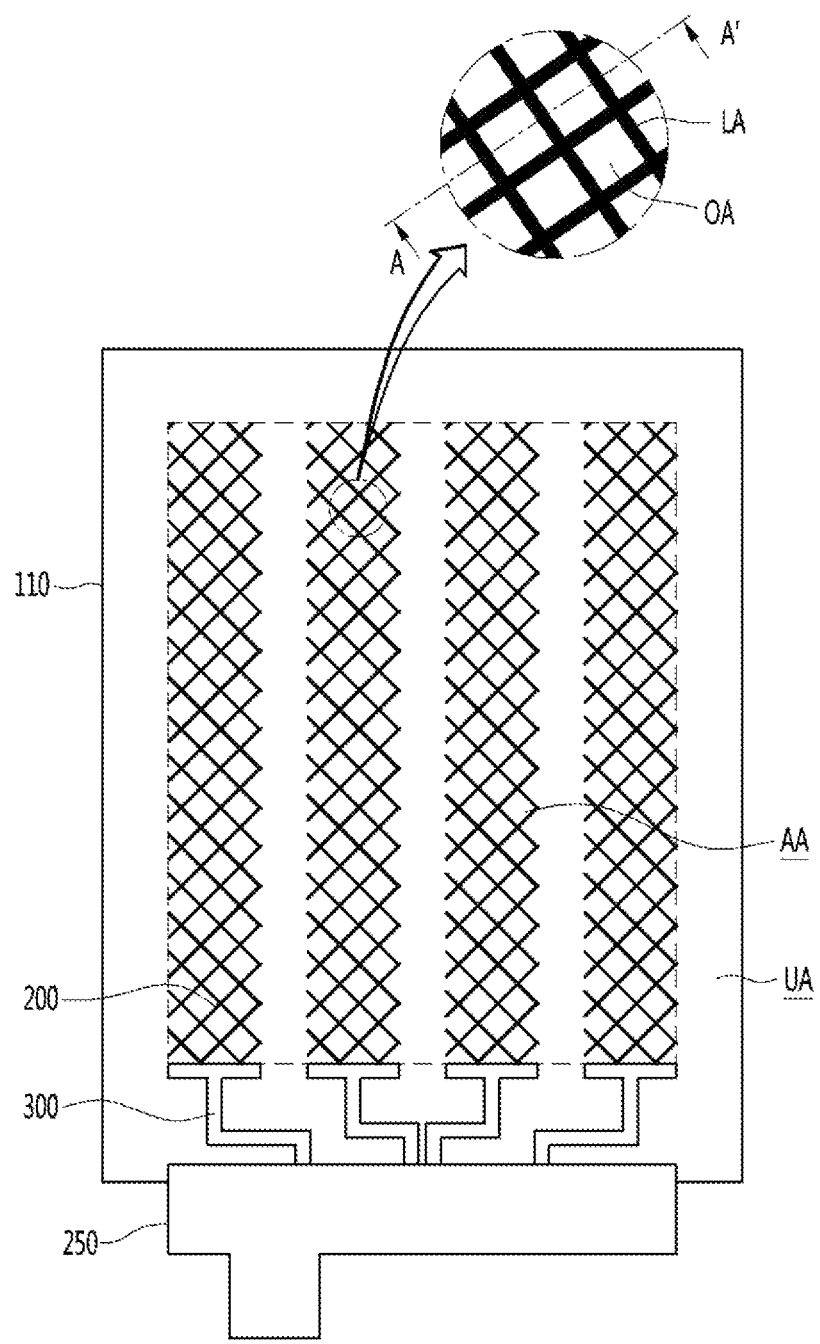
FIG. 10 is a plan view of a touch window according to a third embodiment.

Referring to FIG. 10, in a touch window according to a third embodiment, a sensing electrode 200, a wired electrode 300, and a printed circuit board 250 may be disposed on a substrate 110. That is, the substrate 110 may be a support substrate.

The wired electrode 300 may be connected to the sensing electrode 200 to extend to an unavailable area UA and then be connected to the printed circuit board 250 on the unavailable area UA.

Figure 11:
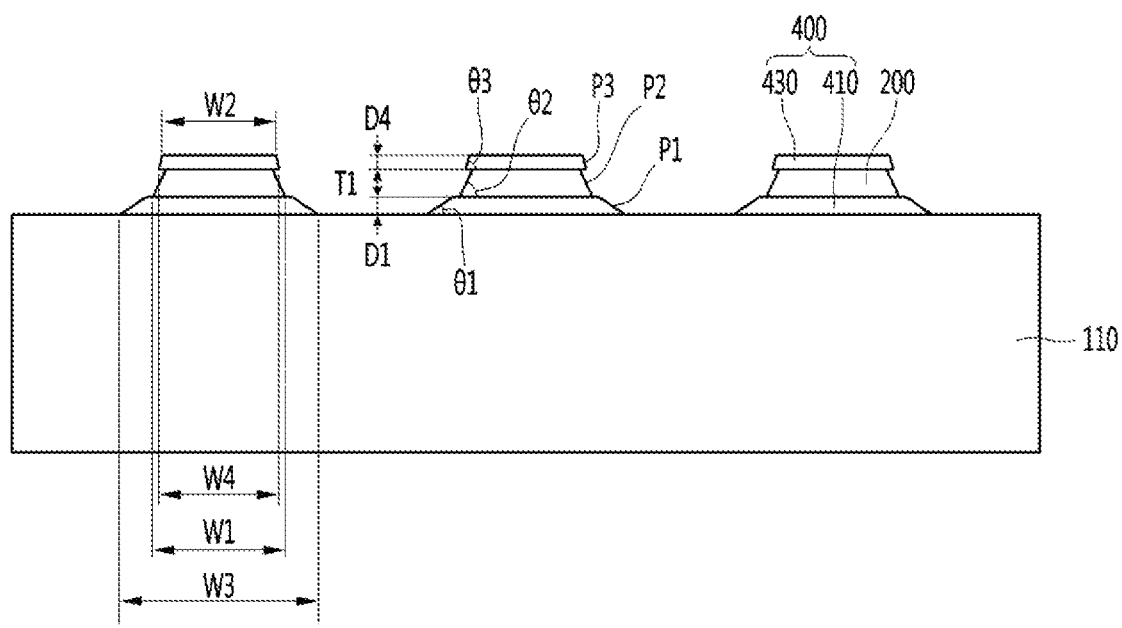
FIG. 11 is a cross-sectional view taken along line A-A' of FIG. 10.
Figure 13:
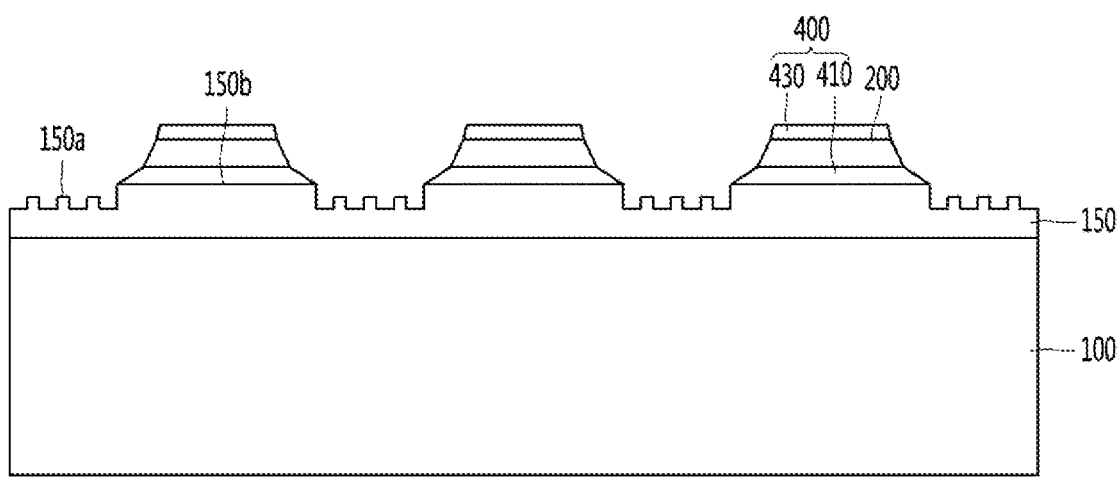
FIG. 13 is further another cross-sectional view taken along line A-A' of FIG. 10.

FIGS. 11 and 13 are cross-sectional views of the touch window according to the third embodiment.

Referring to FIG. 11, a reflection prevention layer 400 may be disposed on the sensing electrode 200. In detail, the reflection prevention layer 400 may be disposed on at least one surface of one surface and the other surface of the sensing electrode 200. In more detail, the reflection prevention layer 400 may be disposed on each of one surface and the other surface of the sensing electrode 200.

Referring to FIG. 11, the reflection prevention layer 400 may include a first reflection prevention layer 410 disposed on the one surface of the sensing electrode 200 and a third reflection prevention layer 430 disposed on the other surface opposite to the one surface.

The first reflection prevention layer 410 may be disposed to come into direct or indirect contact with the one surface of the sensing electrode 200. Also, the reflection prevention layer 430 may be disposed to come into direct or indirect contact with the other surface of the sensing electrode 200.

Thus, the first reflection prevention layer 410, the sensing electrode 200, and the third reflection prevention layer 430 may be successively disposed on the substrate 110.

The sensing electrode 200 may include a material corresponding to that of the reflection prevention layer 400. For example, the sensing electrode 200 may include a metal, and the reflection prevention layer 400 may include oxide including the metal, i.e., metal oxide. However, this embodiment is not limited thereto. For example, the sensing electrode 200 may include a material different from that of the reflection prevention layer 400.

The reflection prevention layer 400 may be a blackening material layer. For example, the reflection prevention layer 400 may include metal oxide having a black color. For example, the reflection prevention layer 400 may include at least one metal oxide selected from CuO, CrO, FeO, and $Ni_2O_3$, but is not limited thereto. For example, the metal oxide may be applied without being limited as long as the metal oxide is a black-based material that is capable of suppressing reflectivity of the sensing electrode 200.

The reflection prevention layer 400 and the sensing electrode 200 may be formed at the same time or formed through separate processes.

The first reflection prevention layer 410 may be disposed on the one surface of the sensing electrode 200 to prevent the sensing electrode 200 made of a metal from being oxidized, thereby improving reliability, and also prevent the reflection due to the total reflection property of the metal from occurring, thereby improving visibility.

Also, the sensing electrode 200 may not come into direct contact with the substrate 110 that is made of a material different from that of the sensing electrode 200, but be disposed on the first reflection prevention layer 410. Thus, the adhesion force of the sensing electrode 200 may be improved to be prevented from being delaminated from the substrate 110.

That is, since the first reflection prevention layer 410 serves as a buffer layer between the substrate 110 and the sensing electrode 200, attachment between the sensing electrode 200 and the substrate 110 may be improved. Thus, the touch window according to this embodiment may be improved in reliability.

Also, the third reflection prevention layer 430 may be disposed on the other surface of the sensing electrode 200 to prevent the sensing electrode made of the metal from being oxidized and prevent the reflection due to the total reflection property of the metal from occurring.

The sensing electrode 200 and/or the reflection prevention layer 400 may have an inclined surface that is inclined with respect to the substrate.

Figure 12:
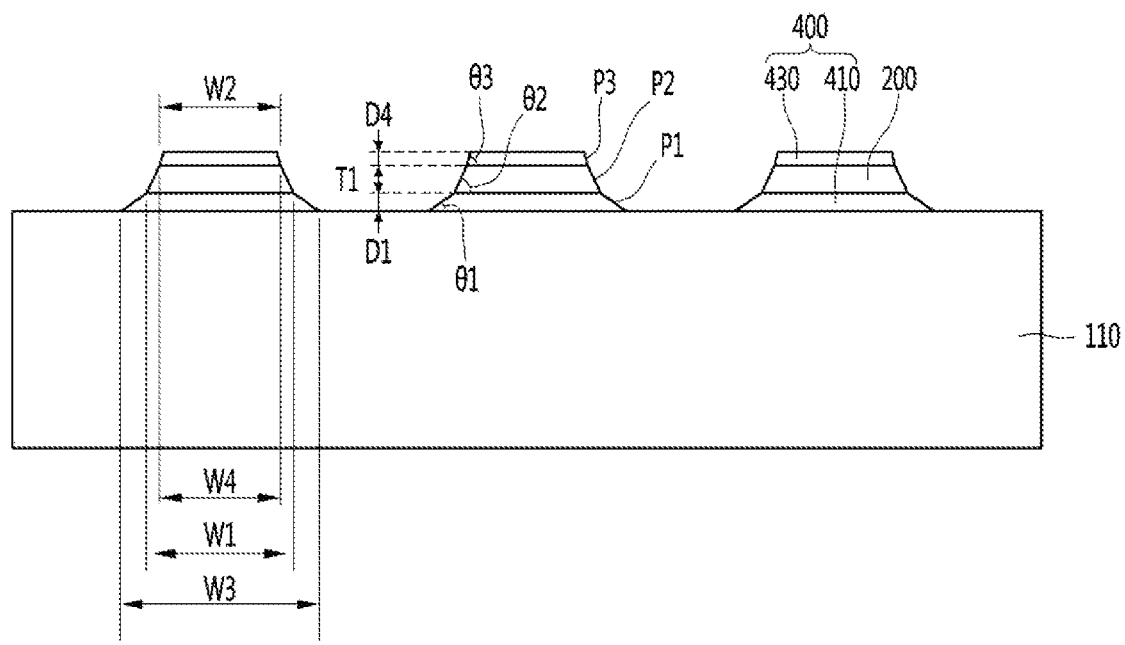
FIG. 12 is another cross-sectional view taken along line A-A' of FIG. 10.

In detail, referring to FIGS. 11 and 12, the first reflection prevention layer 410 may have an inclined surface that is inclined with respect to the substrate 110. For example, the first reflection prevention layer 410 may have one surface coming into contact with the substrate, the other surface opposite to the one surface, and a side surface connecting the one surface to the other surface. Here, the side surface of the first reflection prevention layer 410 may be an inclined surface that is inclined with respect to the substrate.

Also, the sensing electrode 200 may have an inclined surface that is inclined with respect to the substrate 110. For example, the sensing electrode 200 may have one surface coming into contact with the first reflection prevention layer, the other surface opposite to the one surface, and a side surface connecting the one surface to the other surface. Here, the side surface of the sensing electrode 200 may be an inclined surface that is inclined with respect to the substrate.

Also, the third reflection prevention layer 430 may have an inclined surface that is inclined with respect to the substrate 110. For example, the third reflection prevention layer 430 may have one surface coming into contact with the sensing electrode, the other surface opposite to the one surface, and a side surface connecting the one surface to the other surface. Here, the side surface of the third reflection prevention layer 430 may be an inclined surface that is inclined with respect to the substrate.

The side surface of the first reflection prevention layer 410 may be inclined at a first inclined angle $\theta 1$ with respect to the substrate 110. Here, the first inclined angle $\theta 1$ may represent an interior angle of the first reflection prevention layer 410. In detail, the first inclined angle $\theta 1$ may be an interior angle as an angle defined by a side surface P1 of the first reflection prevention layer 410 and one surface of the substrate 110 on which the first reflection prevention layer 410 is disposed.

Also, the side surface of the sensing electrode 200 may be inclined at a second inclined angle $\theta 2$ with respect to the substrate 110. Here, the second inclined angle $\theta 2$ may represent an interior angle of the sensing electrode 200. In detail, the second inclined angle $\theta 2$ may be an interior angle as an angle defined by a side surface P2 of the sensing electrode 200 and one surface of the substrate 110 on which the sensing electrode 200 is disposed.

Also, the side surface of the third reflection prevention layer 430 may be inclined at a third inclined angle $\theta 3$ with respect to the substrate 110. Here, the third inclined angle $\theta 3$ may represent an interior angle of the third reflection prevention layer 430. In detail, the third inclined angle $\theta 3$ may be an interior angle as an angle defined by a side surface P3 of the third reflection prevention layer 430 and one surface of the substrate 110 on which the third reflection prevention layer 430 is disposed.

Each of the first inclined angle $\theta 1$, the second inclined angle $\theta 2$, and the third inclined angle $\theta 3$ may be an acute angle. In detail, the first inclined angle $\theta 1$, the second inclined angle θ2, and the third inclined angle θ3 may be acute angles different from each other.

The first inclined angle θ1 may be different from the second inclined angle θ2. In detail, the first inclined angle θ1 may have an inclination less than that of the second inclined angle θ2. That is, an inclined surface of the first reflection prevention layer 410 may be inclined at an inclined angle less than that of an inclined surface of the sensing electrode 200. Thus, a contact surface between the first reflection prevention layer 410 and the substrate 110 may increase to prevent the sensing electrode 200 from being delaminated or separated from the substrate 110.

Also, the first inclined angle θ1 may be different from the third inclined angle θ3. In detail, the first inclined angle θ1 may have an inclination less than that of the third inclined angle θ3. That is, an inclined surface of the first reflection prevention layer 410 may be inclined at an inclined angle less than that of an inclined surface of the third reflection prevention layer 430. The first reflection prevention layer 410 having the relatively small inclination may be disposed closer than the third reflection prevention layer 430 having the relatively large inclination in a viewing direction of a user. Thus, the first reflection prevention layer 410 may prevent the sensing electrode 200 from being seen. In addition, the first reflection prevention layer 410 may improve light transmittance.

That is, the first inclined angle θ1 may be less than at least one of the second inclined angle θ2 and the third inclined angle θ3. That is, an inclined surface of the first reflection prevention layer 410 may be inclined at an inclined angle less than that of an inclined surface of at least one of the sensing electrode 200 and the third reflection prevention layer 430.

Also, the second inclined angle θ2 may be different from the third inclined angle θ3. In detail, the second inclined angle θ2 may have an inclination less than that of the third inclined angle θ3. That is, an inclined surface of the sensing electrode 200 may be inclined at an inclined angle less than that of an inclined surface of the third reflection prevention layer 430.

That is, the first inclined angle θ1 may be less than at least one of the second inclined angle θ2 and the third inclined angle θ3, and the second inclined angle θ2 may be less than the third inclined angle θ3. That is, an inclined surface of the first reflection prevention layer 410 may be inclined at an inclined angle less than that of an inclined surface of at least one of the sensing electrode 200 and the third reflection prevention layer 430, and an inclined surface of the sensing electrode 200 may be inclined at an inclined angle less than that of a tilt surface of the third reflection prevention layer 430.

The first inclined angle θ1 may range of about 7° to about 20°. In detail, the first inclined angle θ1 may range of about 10° to about 20°. In more detail, the first inclined angle θ1 may range of about 10° to about 16°.

When the first inclined angle θ1 is less than about 7°, the side surface P1 of the first reflection prevention layer 410, i.e., an exposed area of the first reflection prevention layer 410 may increase. Thus, since incident light is diffused, haze may increase, or the transmittance may decrease to deteriorate clarity of the touch window or to be reduced in brightness.

Also, the exposed surface of the first reflection prevention layer 410 may increase, and thus, the first reflection prevention layer 410 may be seen from the outside. Thus, the touch window may be deteriorated in visibility.

Also, when the first inclined angle θ1 exceeds about 20°, reflexibility on the side surface P2 of the sensing electrode 200 may increase to deteriorate the visibility of the touch window.

The second inclined angle θ2 may range of about 20° to about 70°. In detail, the second inclined angle θ2 may range of about 20° to about 50°. In more detail, the second inclined angle θ2 may range of about 30° to about 50°.

Also, when the second inclined angle θ2 is less than about 20°, an exposed area of the sensing electrode 200 may increase to deteriorate the visibility of the touch window due to shining of the metal on the side surface P2 of the sensing electrode 200.

Also, when the side surface P2 of the sensing electrode 200 increases in area, a portion at which the sensing electrode 200 decreases in thickness may increase, and thus, resistance of the sensing electrode 200 may increase to deteriorate the electrical property of the touch window.

The third inclined angle θ3 may range of about 20° to about 70°. In detail, the third inclined angle θ3 may range of about 35° to about 70°. In more detail, the third inclined angle θ3 may range of about 35° to about 65°.

When the third inclined angle θ3 is less than about 20°, an effect for protecting the sensing electrode 200 against external impurities may be reduced to deteriorate the visibility of the touch window. Also, the side surface P3 of the third reflection prevention layer 430 may increase in area, and thus, an area on which the shining of the sensing electrode 200 decreases may be reduced to deteriorate the visibility of the touch window.

That is, each of the second inclined angle θ2 and the third inclined angle θ3 may range from about 20° to about 70°, and the second inclined angle θ2 may be less than the third inclined angle θ3 within the range of about 20° to about 70°.

However, this embodiment is not limited thereto. For example, the ranges of the first inclined angle θ1, the second inclined angle θ2, and the third inclined angle θ3 may vary according to a kind of metals used for the sensing electrode 200 and the reflection prevention layer 400, a kind of etching solutions, and a temperature during etching.

At least one of the sensing electrode 200, the first reflection prevention layer 410, and the third reflection prevention layer 430 may have a width that gradually increases in a direction of the substrate 110.

The first reflection prevention layer 410 may have one surface coming into contact with the substrate and the other surface opposite to the one surface. Here, the one surface may have a width different from that of the other surface. For example, the one surface of the first reflection prevention layer 410 may have a width coming into contact with the substrate, which is greater than that of the other surface opposite to the one surface. In detail, the first reflection prevention layer 410 may have a side surface connecting the one surface to the other surface. Since the side surface of the first reflection prevention layer 410 extends to be inclined at an acute angle with respect to the substrate, the first reflection prevention layer 410 may have a width that gradually decreases from the one surface to the other surface.

The sensing electrode 200 may have one surface coming into contact with the first reflection prevention layer 410 and the other surface opposite to the one surface. Here, the one surface may have a width different from that of the other surface. For example, the one surface of the sensing electrode 200 may have a width coming into contact with the first reflection prevention layer 410, which is greater than that of the other surface opposite to the one surface. In detail, the sensing electrode 200 may have a side surface connecting the one surface to the other surface. Since the side surface of the sensing electrode 200 extends to be inclined at an acute angle with respect to the substrate, the sensing electrode 200 may have a width that gradually decreases from the one surface to the other surface.

The third reflection prevention layer 430 may have one surface coming into contact with the sensing electrode 200 and the other surface opposite to the one surface. Here, the one surface may have a width different from that of the other surface. For example, the one surface of the third reflection prevention layer 430 may have a width coming into contact with the sensing electrode 200, which is greater than that of the other surface opposite to the one surface. In detail, the third reflection prevention layer 430 may have a side surface connecting the one surface to the other surface. Since the side surface of the third reflection prevention layer 430 extend to be inclined at an acute angle with respect to the substrate, the third reflection prevention layer 430 may have a width that gradually decreases from the one surface to the other surface.

At least one of the sensing electrode 200, the first reflection prevention layer 410, and the third reflection prevention layer 430 may have a different width.

Each of the sensing electrode 200, the first reflection prevention layer 410, and the third reflection prevention layer 430 may have a long width and a short width.

Each of the sensing electrode 200, the first reflection prevention layer 410, and the third reflection prevention layer 430 may have the long width at one end that is closer to the substrate 110 and have the short width at the other end opposite to the one end, which is far away from the substrate 110.

The first reflection prevention layer 410 may have a long width W3 different from that of the sensing electrode 200, i.e., a width W1 of a bottom surface of the sensing electrode. In detail, the first reflection prevention layer 410 may have a long width W3 greater than that W1 of the sensing electrode 200.

Also, the first reflection prevention layer 410 may have a long width W3 different from that W4 of the third reflection prevention layer 430. In detail, the first reflection prevention layer 410 may have a long width W3 greater than that W4 of the third reflection prevention layer 430.

That is, the first reflection prevention layer 410 may have a long width W3 greater than at least one of a long width W1 of the sensing electrode 200 and a long width W4 of the third reflection prevention layer 430.

Also, the sensing electrode 200 may have a long width W1 different from that W4 of the third reflection prevention layer 430. Also, the sensing electrode 200 may have a long width W1 greater than that W4 of the third reflection prevention layer 430.

That is, the first reflection prevention layer 410 may have a long width W3 greater than that W1 of the sensing electrode 200, and the sensing electrode 200 may have a long width W1 greater than that W4 of the third reflection prevention layer 430. Since the first reflection prevention layer 410 having the width greater than that of the sensing electrode 200 is disposed in the viewing direction of the user, light reflected from the sensing electrode 200 may be minimized to improve the visibility of the touch window.

The sensing electrode 200 may have a thickness different from that of at least one reflection prevention layer of the first reflection prevention layer 410 and the third reflection prevention layer 430.

The sensing electrode 200 may have a thickness T1 greater than that D1 of the first reflection prevention layer 410. The sensing electrode 200 may have a thickness T1 greater than that D4 of the third reflection prevention layer 430.

The sensing electrode 200 may have a thickness T1 of about 110 nm to about 400 nm. For example, the sensing electrode 200 may have a thickness T1 of about 110 nm to about 400 nm. For example, the sensing electrode 200 may have a thickness T1 of about 150 nm to about 250 nm.

For example, when the sensing electrode 200 has a thickness T1 less than about 110 nm, the electrode may increase in resistance to deteriorate the electrical property of the touch window and thereby to deteriorate the reliability of the touch window. Also, when the sensing electrode 200 has a thickness exceeding about 400 nm, the whole thickness of the touch window may increase to deteriorate the process efficiency.

For example, the first reflection prevention layer 410 may have a thickness D1 of about 50 nm to about 200 nm. For example, the first reflection prevention layer 410 may have a thickness D1 of about 50 nm to about 150 nm. For example, the first reflection prevention layer 410 may have a thickness D1 of about 70 nm to about 130 nm.

When the first reflection prevention layer 410 has a thickness D1 less than about 50 nm, the sensing electrode 200 may be seen. Also, when the first reflection prevention layer 410 has a thickness D1 exceeding about 200 nm, the whole thickness of the touch window may increase to deteriorate the process efficiency.

For example, the third reflection prevention layer 430 may have a thickness D4 of about 50 nm to about 200 nm. For example, the third reflection prevention layer 430 may have a thickness D4 of about 50 nm to about 150 nm. For example, the third reflection prevention layer 430 may have a thickness D4 of about 70 nm to about 130 nm.

When the third reflection prevention layer 430 has a thickness D1 less than about 50 nm, the sensing electrode 200 may be seen. Also, when the third reflection prevention layer 430 has a thickness D4 exceeding about 200 nm, the whole thickness of the touch window may increase to deteriorate the process efficiency.

Referring to FIG. 11, at least one of the first reflection prevention layer 410, the sensing electrode 200, and the third reflection prevention layer 430 may have a stepped portion and be disposed on the substrate 110.

The first reflection prevention layer 410 may have a side surface P1 that is spaced apart from a side surface P2 of the sensing electrode 200. For example, the side surface P2 of the sensing electrode 200 may come into contact with the top surface of the first reflection prevention layer 410.

The side surface P2 of the sensing electrode 200 may be disposed to be spaced apart from a side surface P3 of the third reflection prevention layer 430. For example, the side surface P2 of the sensing electrode 200 may come into contact with the bottom surface of the third reflection prevention layer 430.

The third reflection prevention layer 430 may have a long width W4 different from a short width W2 of the sensing electrode 200, i.e., a width of the top surface of the sensing electrode 200. The third reflection prevention layer 430 may have a long width W4 greater than the short width W2 of the sensing electrode 200. Also, since a material of the sensing electrode 200 is etched more than that of the third reflection prevention layer 430, the third reflection prevention layer 430 may have a long width W4 greater than the short width W2 of the sensing electrode 200.

The first reflection prevention layer 410 may have a short width greater than the long width W1 of the sensing electrode 200. Also, since the material of the sensing electrode 200 is etched more than that of the first reflection prevention layer 410, the first reflection prevention layer 410 may have a short width greater than the long width W1 of the sensing electrode 200.

Referring to FIG. 12, the first reflection prevention layer 410 may have the side surface P1 coming into contact with the side surface P2 of the sensing electrode 200. The side surface P2 of the sensing electrode 200 may come into contact with the side surface P3 of the third reflection prevention layer 430.

The third reflection prevention layer 430 may have a long width W4 corresponding to the short width W2 of the sensing electrode 200. The sensing electrode 200 may have a long width W1 different from the short width of the first reflection prevention layer 410.

Referring to FIG. 13, the base member 150 on which patterns having sizes different from each other are formed may be disposed on the substrate 110. The base member 150 may include a photocurable resin (UV resin) or a thermosetting resin.

The base member 150 may include a first pattern 150a and a second pattern 150b. In detail, the base member 150 may include a first pattern 150a and a second pattern 150b, which have widths different from each other. Also, each of the first pattern 150a and the second pattern 150a may be an embossed pattern. Also, the first pattern 150a may have a width of several nanometers (nm), and the second pattern 150b may have a width of several micrometers (μm). That is, the second pattern 150b may have a width greater than that of the first pattern 150a.

The sensing electrode 200 and the reflection prevention layer 400 may be disposed on the second pattern 150b.

Figure 14:
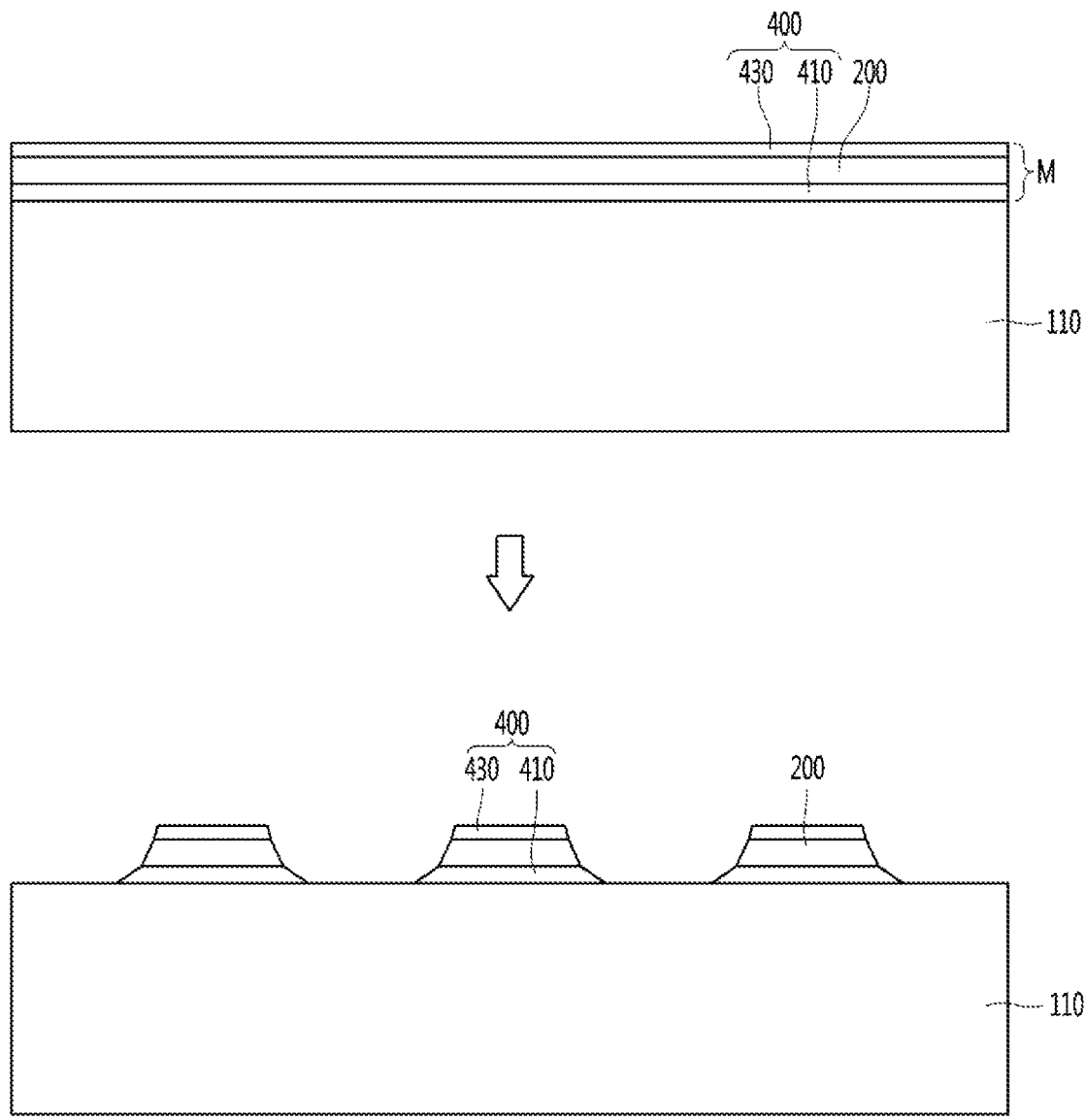
FIGS. 14 to 15 are views illustrating a process of manufacturing the touch window according to the third embodiment.
Figure 15:
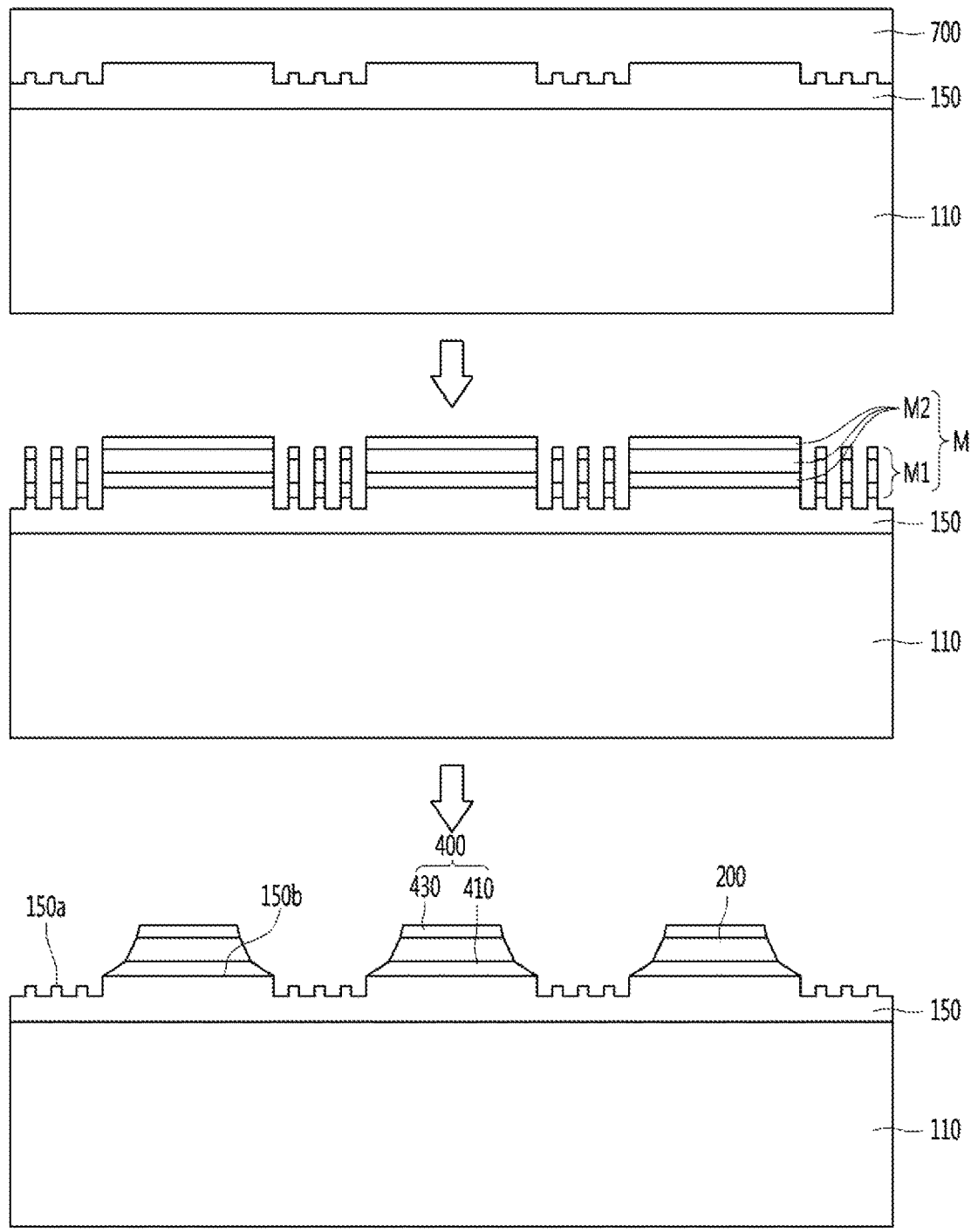

FIGS. 14 and 15 are views illustrating a process of manufacturing the touch window according to the third embodiment.

Referring to FIG. 14, the sensing electrode 200 and the reflection prevention layer 400 may be formed at the same time or formed through separate processes. However, this embodiment is not limited to the manufacturing process. For example, the manufacturing processes may be changed in order according to characteristics of the manufacturing processes.

In the sensing electrode 200 according to an embodiment, a metal layer M may be disposed on an entire surface of the substrate 110. Then, the metal layer M may be etched in a mesh shape to form an electrode having the mesh shape. For example, a metal such as copper (Cu) may be deposited on the entire surface of the substrate 110 made of polyethylene terephthalate and then etched to form an embossed copper metal mesh electrode having the mesh shape.

For example, in the reflection prevention layer 400, the metal such as copper (Cu) may be deposited on the entire surface of the substrate 110, and then a sputtering process may be performed by using oxygen and/or nitrogen gas under an argon atmosphere to form at least one compound of oxide, nitride, and oxynitride such as CuO, CuN, $Cu_2ON$, and CuON. However, this embodiment is not limited to the sputtering process. For example, the electrode pattern may be formed through various methods such as deposition using electroless plating.

That is, the first reflection prevention layer 410, the sensing electrode 200, and the third reflection prevention layer 430 may be successively formed on the substrate 110.

Then, the first reflection prevention layer 410, the sensing electrode 200, and the third reflection prevention layer 430 may be etched at the same time by using one etching solution.

In the touch window according to an embodiment, the pattern may be formed through a single process using one etching solution to improve process efficiency.

The sensing electrode 200, the first reflection prevention layer 410, and the third reflection prevention layer 430 may have etching rates different from each other due to a difference in adhesion area with the etching solution when the etching is performed.

That is, since the third reflection prevention layer 430 is exposed while coming into most direct contact with the etching solution, the third reflection prevention layer 430 may be most removed.

Since the sensing electrode 200 has a relatively small contact area with the etching solution when compared to the third reflection prevention layer 430, less etching may occur on the third reflection prevention layer 430.

Also, since the third reflection prevention layer 430 has a relatively small contact area with the etching solution when compared to the sensing electrode 200, less etching may occur on the sensing electrode 200.

That is, the sensing electrode 200 and the reflection prevention layer 400 may be more frequently etched as the sensing electrode 200 and the reflection prevention layer 400 are far away from the substrate 110.

Thus, the first reflection prevention layer 410, the sensing electrode 200, and the third reflection prevention layer 430 may have inclined angles θ1, θ2, and θ3, which are different from each other. Also, the first reflection prevention layer 410, the sensing electrode 200, and the third reflection prevention layer 430 may have long widths W1, W2, and W3, which are different from each other.

Referring to FIG. 15, each of the first pattern 150a and the second pattern 150b may be formed by imprinting a mold 700 having an engraved pattern having a shape that is complementary to an embossed pattern.

At least one metal layer of Cr, Ni, Cu, Al, Ag, Mo, and an alloy thereof may be deposited on the base member 150 through a sputtering process. For example, the reflection prevention layer may be formed under the sputtering conditions as illustrated in FIG. 13.

Then, the metal layer M formed on the first pattern 150a and the second pattern 150b may be etched to remove a meal layer M1 formed on the first pattern 150a, and the metal layer M2 formed on the second pattern 150b may remain to form an metal electrode having a mesh shape.

Here, when the metal layer M is etched, an etching rate may vary according to a difference in adhesion area between the first pattern 150a and the second pattern 150b. That is, since an adhesion area between pattern 150b and the metal layer M is greater than that between the first pattern 150a and the metal layer, less etching may occur on the electrode material formed on the second pattern 150b, and thus, the metal layer formed on the second pattern 150b may remain, and the metal layer formed on the first pattern 150a may be etched to be removed according to the same etching rate. Thus, the metal electrode including the second pattern 150b having the embossed or engraved mesh shape may be formed on the substrate.

That is, the sensing electrode 200 and the reflection prevention layer 400 may be disposed on the second pattern 150b. Descriptions of the same or similar portions as the descriptions of FIG. 13 will be omitted. However, this embodiment is not limited to the manufacturing process. For example, the manufacturing processes may be changed in order according to characteristics of the manufacturing processes.

Figure 16:
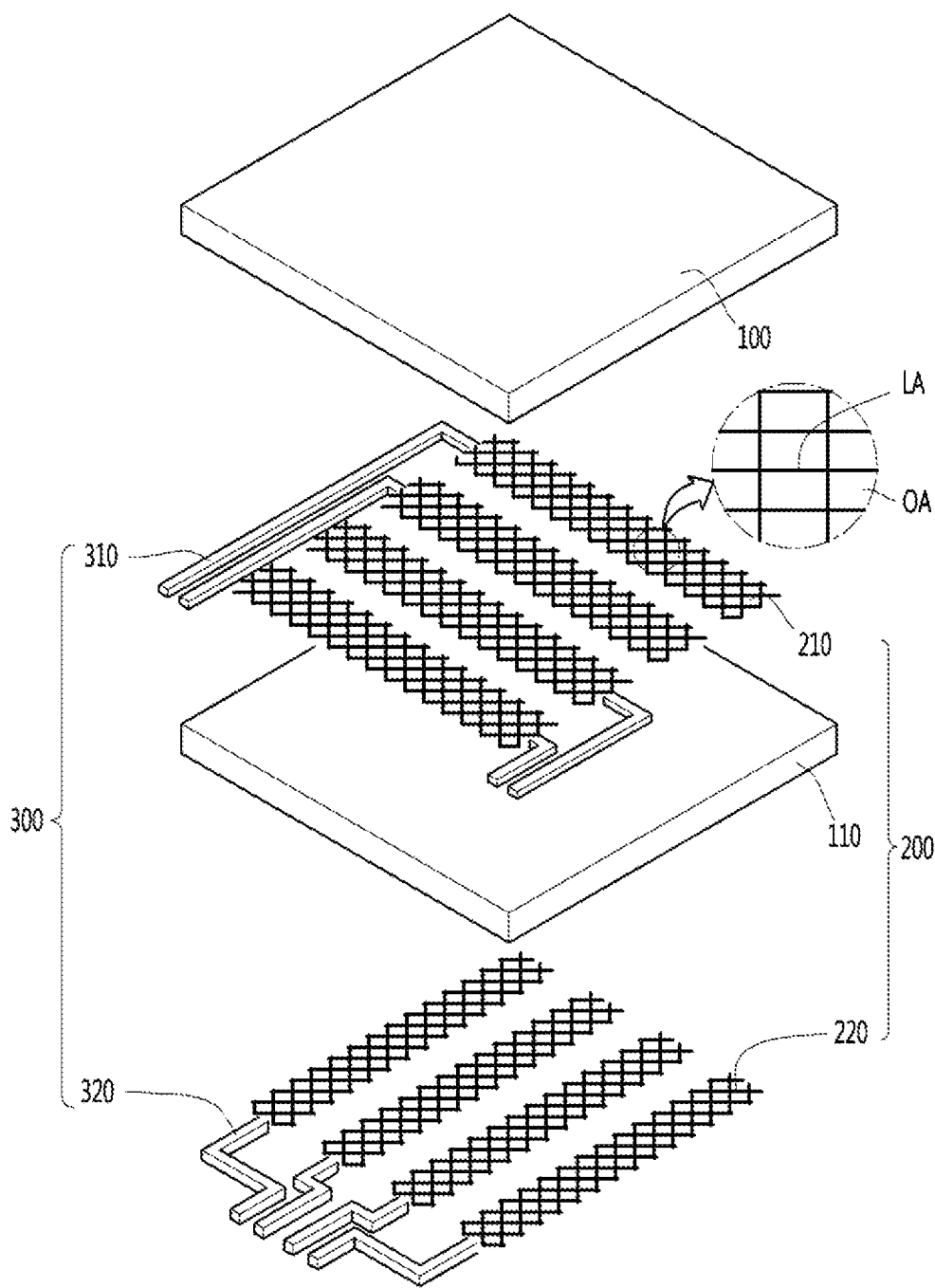
FIG. 16 is a perspective view of the touch window according to the third embodiment.

Referring to FIG. 16, a cover substrate 100 may be further disposed on the substrate 110.

Although not shown, a reflection prevention layer may be disposed on at least one surface of the sensing electrode 200 and/or the wired electrode 300. In detail, a first reflection prevention layer may be disposed on one surface of the sensing electrode 200 and/or the wired electrode 300, and a second reflection prevention layer may be disposed on the other surface opposite to the one surface.

At least one reflection prevention layer of the first reflection prevention layer and the second reflection prevention layer may have a long width greater than a width of the sensing electrode 200 and/or the wired electrode 300. Since the reflection prevention layer having the long width greater than the width of the sensing electrode 200 and/or the wired electrode 300 is disposed in a viewing direction of a user, light reflected from the sensing electrode 200 and/or the wired electrode 300 may be minimized to improve visibility of the touch window.

Figure 17:
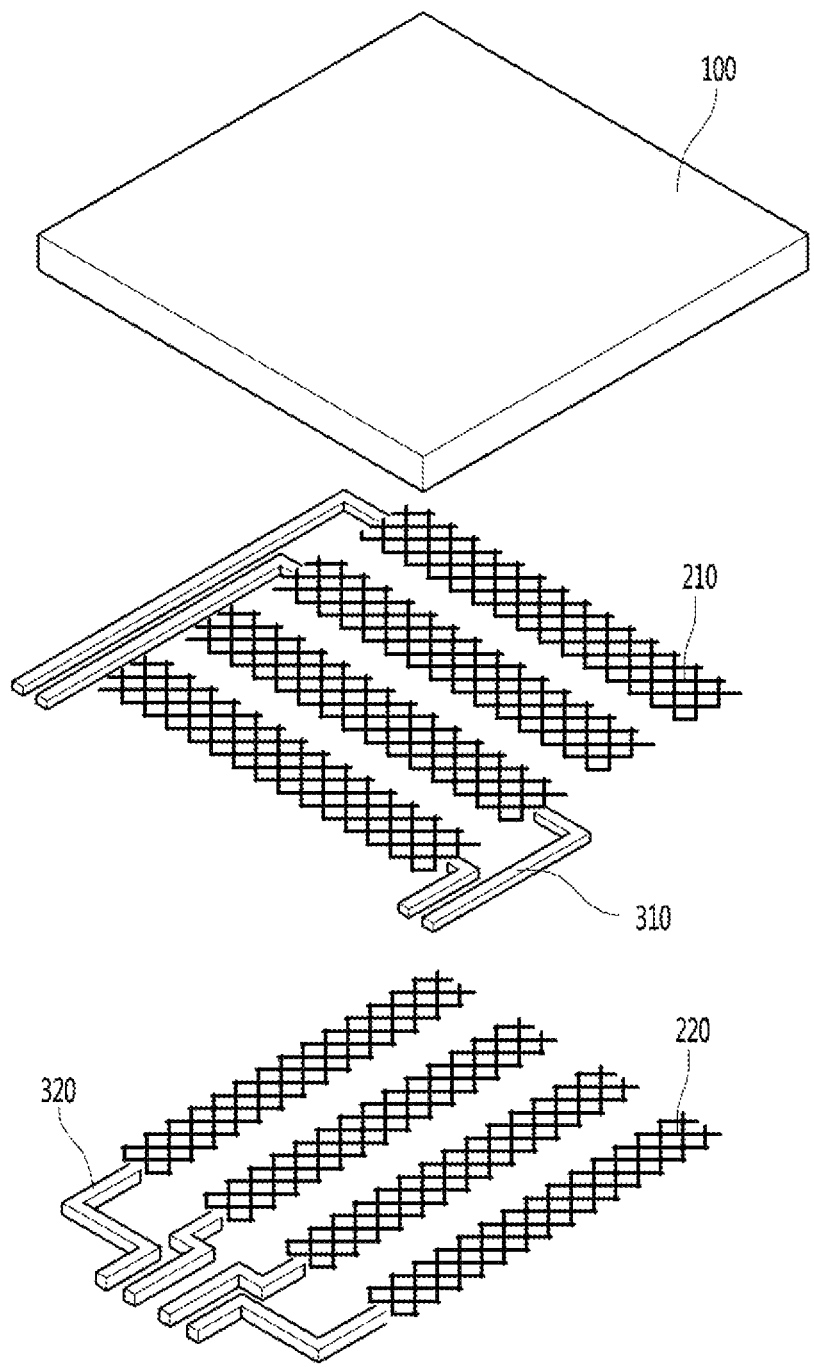
FIGS. 17 to 19 are views for explaining various types of touch windows according to the first, second, and third embodiments.
Figure 18:
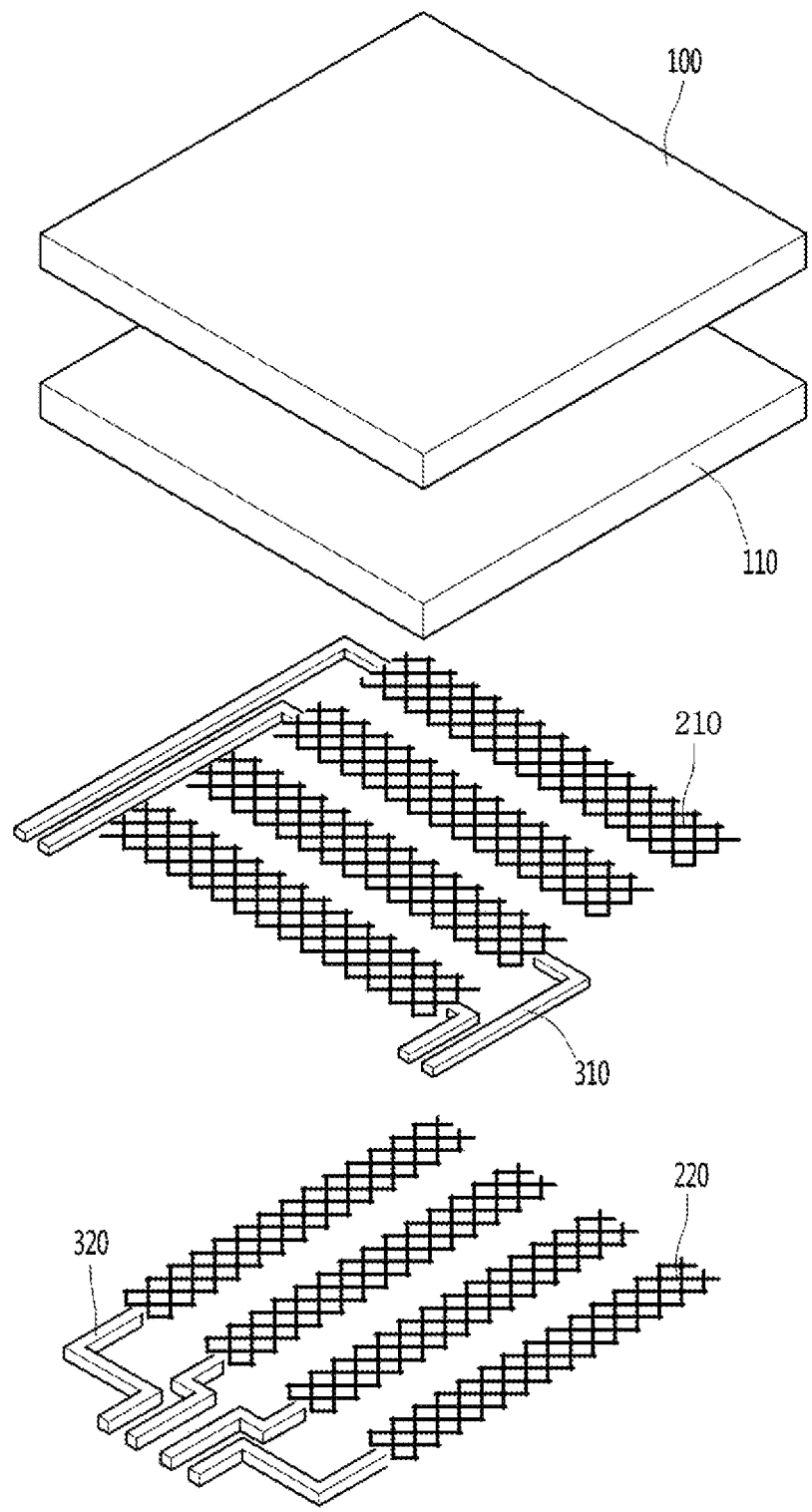
Figure 19:
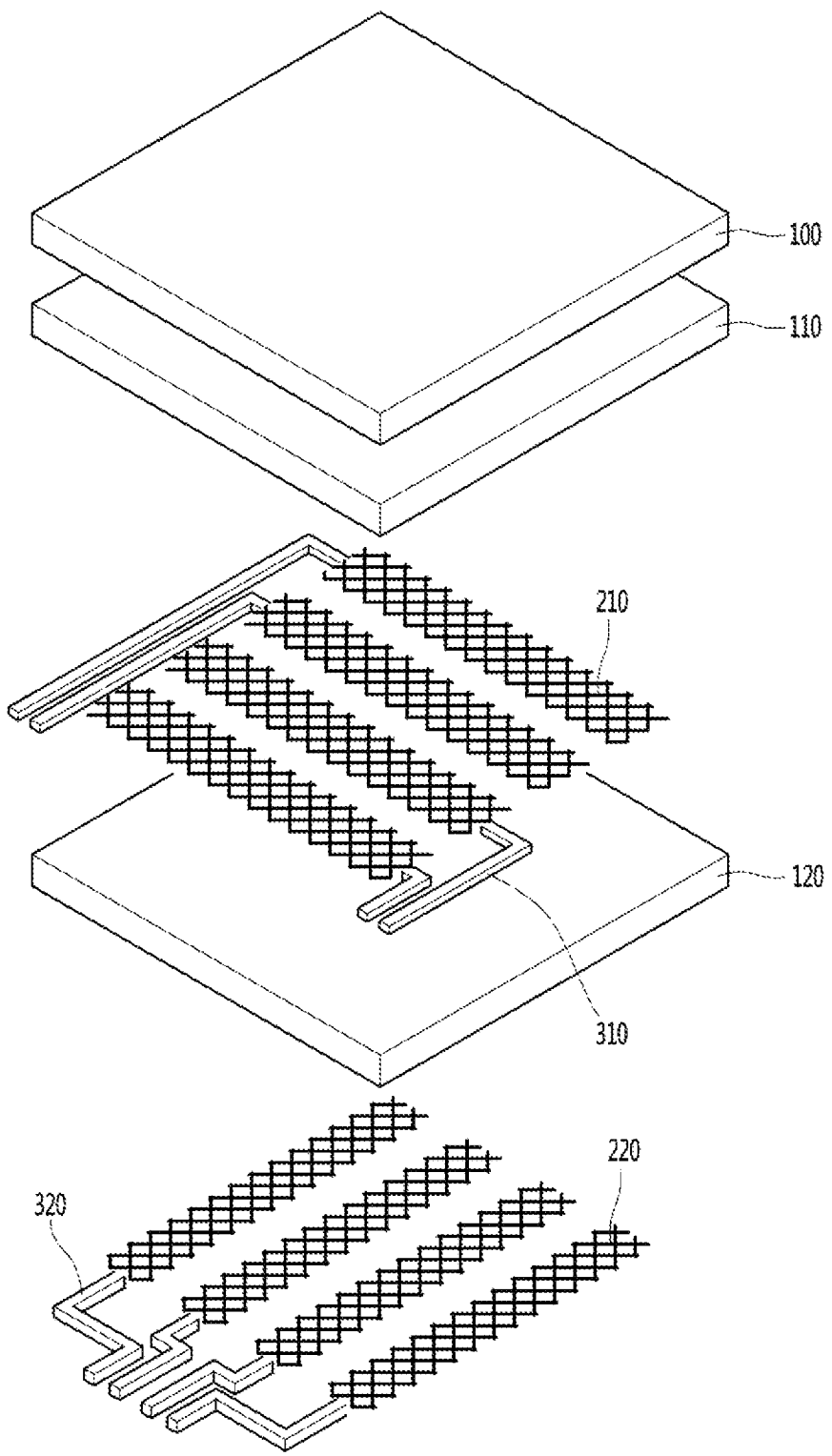

FIGS. 17 to 19 are views for explaining various types of touch windows according to the first, second, and third embodiments.

Referring to FIG. 17, the touch window according to the embodiments may include a cover substrate 100. Also, a first sensing electrode 210 and a second sensing electrode 220 may be disposed on the cover substrate 100.

For example, the first sensing electrode 210 and the second sensing electrode 220 may be disposed on one surface of the cover substrate 100. In detail, the first sensing electrode 210 and the second sensing electrode 220 may be disposed on the same surface of the cover substrate 100.

The first and second sensing electrodes 210 and 220, which extend in different directions, the first wired electrode 310 connected to the first sensing electrode 210, and the second wired electrode 320 connected to the second sensing electrode 220 may be disposed on the same surface of the cover substrate 100, and the first sensing electrode and the second sensing electrode may be disposed to be spaced apart from each other or insulated from each other on the same surface of the cover substrate 100. That is, the first sensing electrode 210 may extend in one direction, and the second sensing electrode 220 may extend in the other direction different from the one direction.

Referring to FIG. 18, the touch window according to the embodiments may include the cover substrate 100 and a substrate 110 disposed on the cover substrate 100.

Also, the first sensing electrode 210 and the second sensing electrode 220 may be disposed on the substrate 110.

For example, the first sensing electrode 210 and the second sensing electrode 220 may be disposed on one surface of the substrate 110. In detail, the first sensing electrode 210 and the second sensing electrode 220 may be disposed on the same surface of the substrate 110.

The first and second sensing electrodes 210 and 220, which extend in different directions, the first wired electrode 310 connected to the first sensing electrode 210, and the second wired electrode 320 connected to the second sensing electrode 220 may be disposed on the same surface of the substrate 110, and the first sensing electrode 210 and the second sensing electrode 220 may be disposed to be spaced apart from each other or insulated from each other on the same surface of the substrate 110. That is, the first sensing electrode 210 may extend in one direction, and the second sensing electrode 220 may extend in the other direction different from the one direction.

Referring to FIG. 19, the touch window according to the embodiments may include the cover substrate 100, a first substrate 110 disposed on the cover substrate 100, and a second substrate 120 disposed on the first substrate 110.

The cover substrate 100, the first substrate 110, and the second substrate 120 may adhere to each other through an adhesion layer.

Also, the first sensing electrode 210 may be disposed on the first substrate 110, and the second sensing electrode 220 may be disposed on the second substrate 120.

In detail, the first sensing electrode 210 extending in one direction and the first wired electrode 310 connected to the first sensing electrode 210 are disposed on one surface of the first substrate 110, and the second sensing electrode 220 extending in a direction different from the extension direction of the first sensing electrode 210 and the second wired electrode 320 connected to the second sensing electrode 220 may be disposed on one surface of the second substrate 120.

Hereinafter, a touch device to which the above-described touch window and a display panel are coupled will be described with reference to FIGS. 20 to 22.

Figure 20:
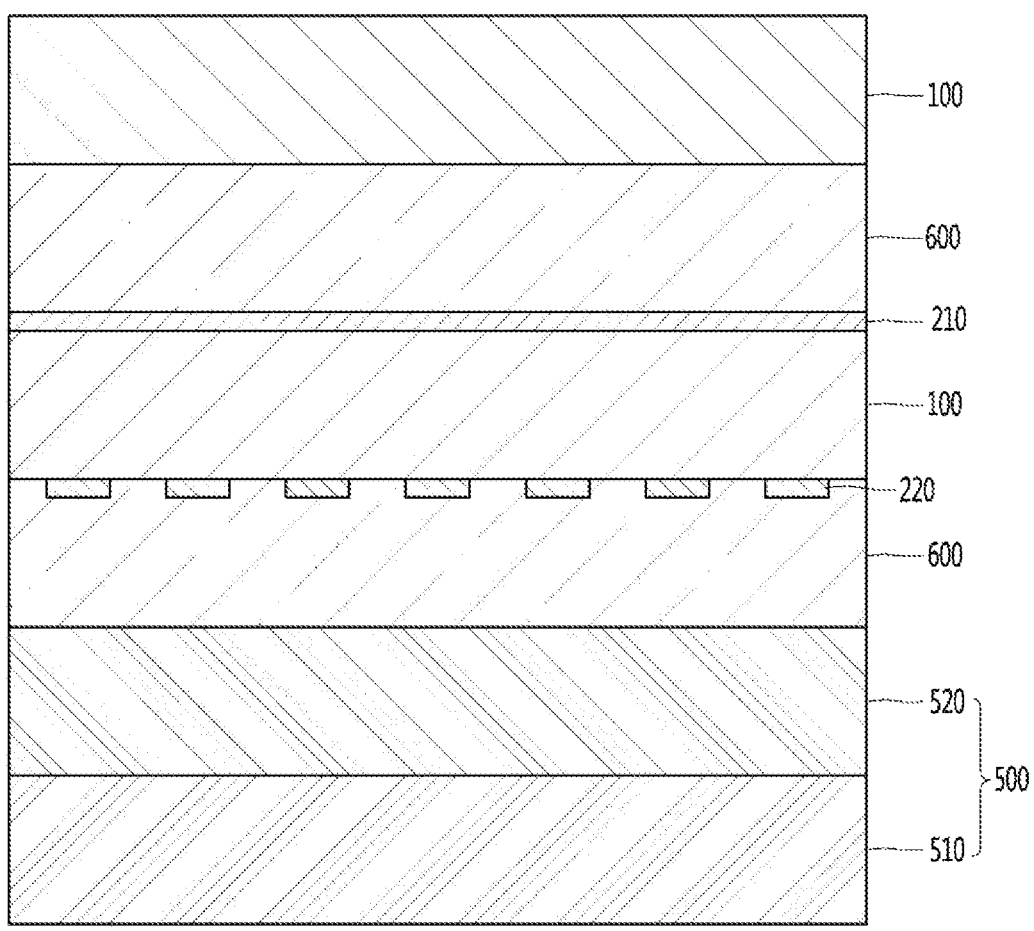
FIGS. 20 to 22 are views for explaining a touch device to which the touch window and a display panel are coupled according to the first, second, and third embodiments.

Referring to FIG. 20, a touch device according to an embodiment may include a touch window disposed on a display panel 500.

In detail, referring to FIG. 20, the touch device may be formed by coupling the touch window including the cover substrate 100 and the substrate 110 to the display panel 500. The substrate 110 and the display panel 500 may adhere to each other through an adhesion layer 600. For example, the substrate 110 and the display panel 500 may be combined with each other through an adhesion layer 600 including an optically clear adhesive (OCA) or an optically clear resin (OCR).

The display panel 500 may include a first' substrate 510 and a second' substrate 520.

When the display panel 500 is a liquid crystal display panel, the display panel 500 may has a structure in which a first' substrate 510 including a thin film transistor (TFT) and a pixel electrode and a second' substrate 520 including color filter layers are combined with a liquid crystal layer therebetween.

Also, the display panel 500 may be a liquid crystal display panel having a color filter on transistor (OCT) structure in which a thin film transistor, a color filter, and a black matrix are formed on the first' substrate 510, and the second' substrate 520 and the first' substrate 510 are combined with a liquid crystal layer therebetween. That is, the thin film transistor may be formed on the first' substrate 510, a protection layer formed on the thin film transistor, and the color filter layer may be formed on the protection layer. Also, the pixel electrode coming into contact with the thin film transistor is formed on the first' substrate 510. Here, the black matrix may be omitted to improve an aperture ratio and simplify a masking process. Thus, a common electrode may share a function of the black matrix.

Also, when the display panel 500 is a liquid crystal display panel, the display device may further include a backlight unit that provides light to a rear surface of the display panel 500.

When the display panel 500 is an organic electro luminescent display panel, the display panel 500 may include a self-luminance device that does not require a separate light source. In the display panel 500, the thin film transistor and an organic light-emitting device coming into contact with the thin film transistor may be disposed on the first' substrate

510. The organic light-emitting device may include a positive electrode, a negative electrode, and an organic light-emitting layer disposed between the positive electrode and the negative electrode. Also, the display panel 500 may further include the second' substrate 520 serving as an encapsulation substrate for encapsulation or a barrier substrate on the organic light-emitting device.

Figure 21:
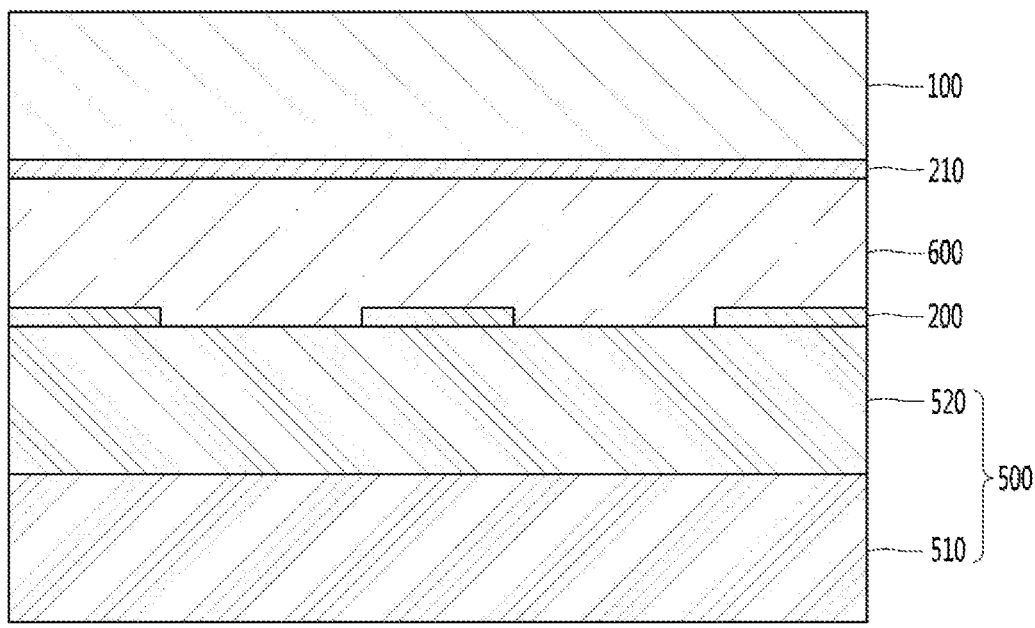

Referring to FIG. 21, the touch device according to an embodiment may include the touch window integrated with the display panel 500. That is, the substrate supporting at least sensing electrode may be omitted.

In detail, at least one sensing electrode may be disposed on at least one surface of the display panel 500. That is, at least one sensing electrode may be formed on at least one surface of the first' substrate 510 or the second' substrate 520.

Here, at least one sensing electrode may be formed on a top surface of the substrate that is disposed at an upper side.

Referring to FIG. 21, the first sensing electrode 210 may be disposed on one surface of the cover substrate 100. Also, the first wiring connected to the first sensing electrode 210 may be disposed. Also, the second sensing electrode 220 may be disposed on one surface of the display panel 500. Also, the second wiring connected to the second sensing electrode 220 may be disposed.

The adhesion layer 600 may be disposed between the cover substrate 100 and the display panel 500 to combine the cover substrate with the display panel 500.

Also, a polarizing plate may be further disposed on a lower portion of the cover substrate 100. The polarizing plate may be a linear polarizing plate or an external light reflection prevention polarizing plate. For example, when the display panel 500 is the liquid crystal display panel, the polarizing plate may be the linear polarizing plate. Also, when the display panel 500 is the organic electro luminescent display panel, the polarizing plate may be the external light reflection prevention polarizing plate.

Also, at least one sensing electrode may be disposed on one surface of the polarizing plate.

In the touch device according to an embodiment, at least one substrate supporting the sensing electrode may be omitted. Thus, the thin and lightweight touch device may be formed.

Sequentially, referring to FIG. 22, a touch device according to another embodiment will be described. Here, descriptions duplicated with those of the foregoing embodiments will be omitted. The same constituent will be given by the same reference numeral.

Figure 22:
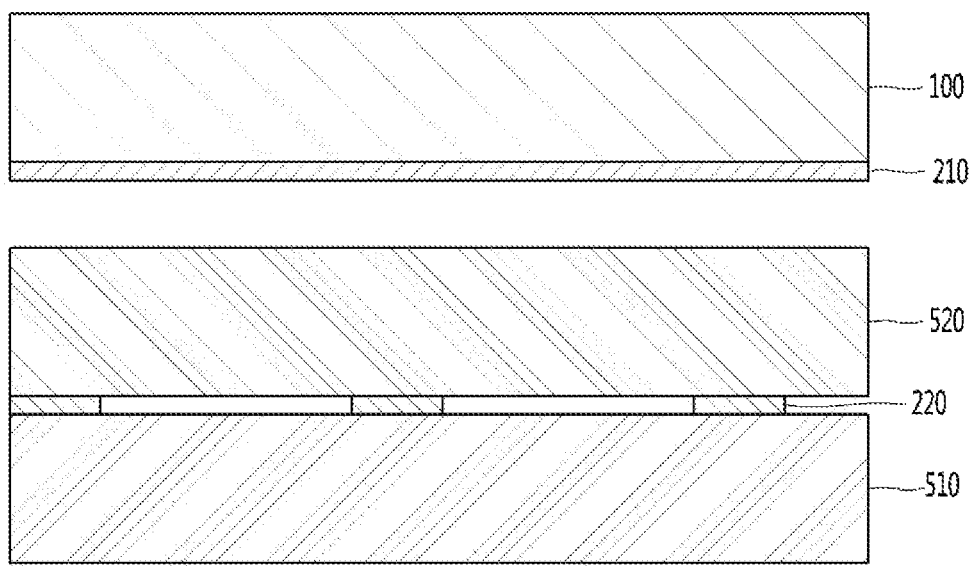

Referring to FIG. 22, a touch device according to another embodiment may include a touch window integrated with a display panel 500. That is, a substrate supporting at least sensing electrode may be omitted.

For example, a sensing electrode disposed on an available area to serve as a sensor for sensing touch and a wiring for applying an electrical signal to the sensing electrode may be formed inside the display panel. In detail, at least one sensing electrode or at least one wiring may be formed inside the display panel.

The display panel includes a first' substrate 510 and a second' substrate 520. Here, at least one sensing electrode of the first sensing electrode 210 and the second sensing electrode 220 may be disposed between the first' substrate 510 and the second' substrate 520. That is, at least one sensing electrode may be disposed on at least one surface of the first' substrate 510 or the second' substrate 520.

Referring to FIG. 22, the first sensing electrode 210 may be disposed on one surface of the cover substrate 100. Also, the first wiring connected to the first sensing electrode 210 may be disposed. Also, the second sensing electrode 220 and a second wiring may be disposed between the first' substrate 510 and the second' substrate 520. That is, the second sensing electrode and the second wiring may be disposed inside the display panel, and the first sensing electrode 210 and the first wiring may be disposed outside the display panel.

The second sensing electrode 220 and the second wiring may be disposed on a top surface of the first' substrate 510 or a rear surface of the second' substrate 520.

Also, a polarizing plate may be further disposed on a lower portion of the cover substrate 100.

Also, at least one sensing electrode may be disposed on one surface of the polarizing plate.

When the display panel 2 is a liquid crystal display panel, and the second sensing electrode is disposed on the top surface of the first' substrate 510, the sensing electrode may be formed together with a thin film transistor (TFT) or a pixel electrode. Also, when the second sensing electrode is formed on the rear surface of the second' substrate 520, a color filter layer may be formed on the sensing electrode, and the sensing electrode may be formed on the color filter layer. When the display panel is a liquid crystal display panel, and the second sensing electrode is disposed on the top surface of the first' substrate 510, the sensing electrode may be formed together with the thin film transistor or an organic light-emitting device.

In the touch device according to an embodiment, at least one substrate supporting the sensing electrode may be omitted. Thus, the thin and lightweight touch device may be formed. Also, the sensing electrode and the wiring may be formed together with the device formed on the display panel to simplify the process and reduce costs.

Hereinafter, an example of a display device to which the touch window according to the foregoing embodiments is applied will be described with reference to FIGS. 23 to 26.

Figure 23:
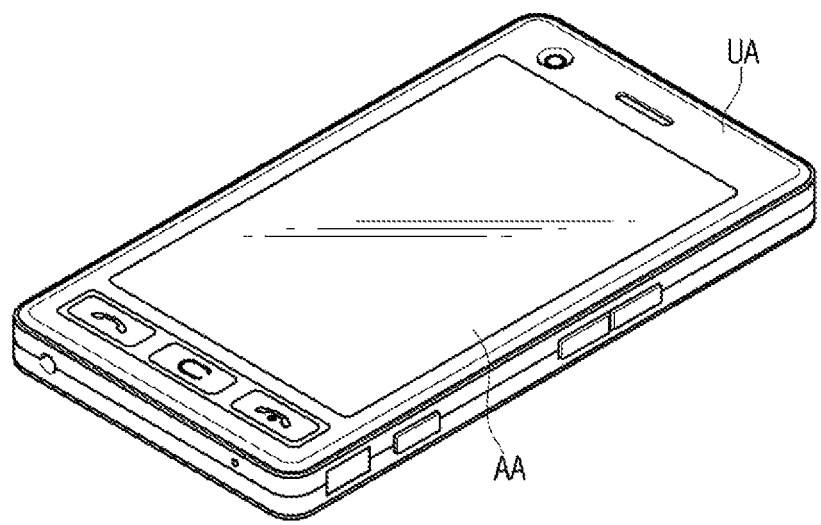
FIGS. 23 to 26 are views illustrating an example of a touch device to which the touch window is applied according to the first, second, and third embodiments.

Referring to FIG. 23, a mobile terminal is illustrated as an example of the touch device. The mobile terminal may have an available area AA and an unavailable area UA. The available area AA may sense a touch signal generated by touch of a finger or the like, and a command icon pattern part and a logo may be formed on the unavailable area.

Figure 24:
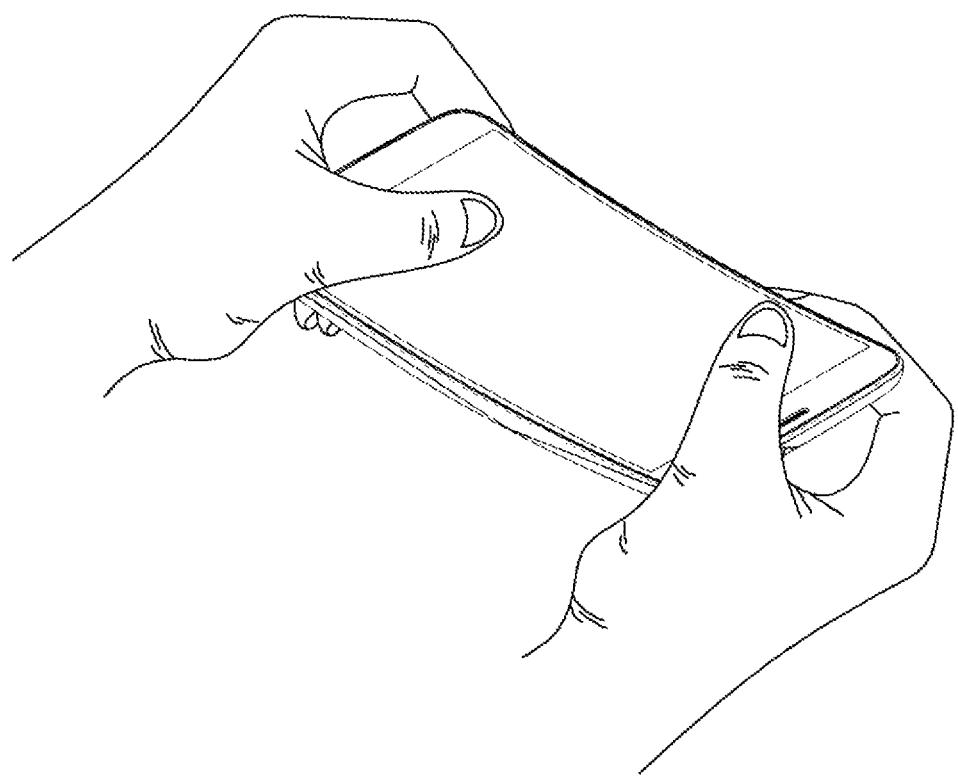

Referring to FIG. 24, the touch window may include a flexible touch window that is bendable. Thus, the touch device including the flexible touch window may be a flexible touch device. Thus, the touch device may be bent or curved by user's hand. The flexible touch window may be applied to wearable touch and the like.

Figure 25:
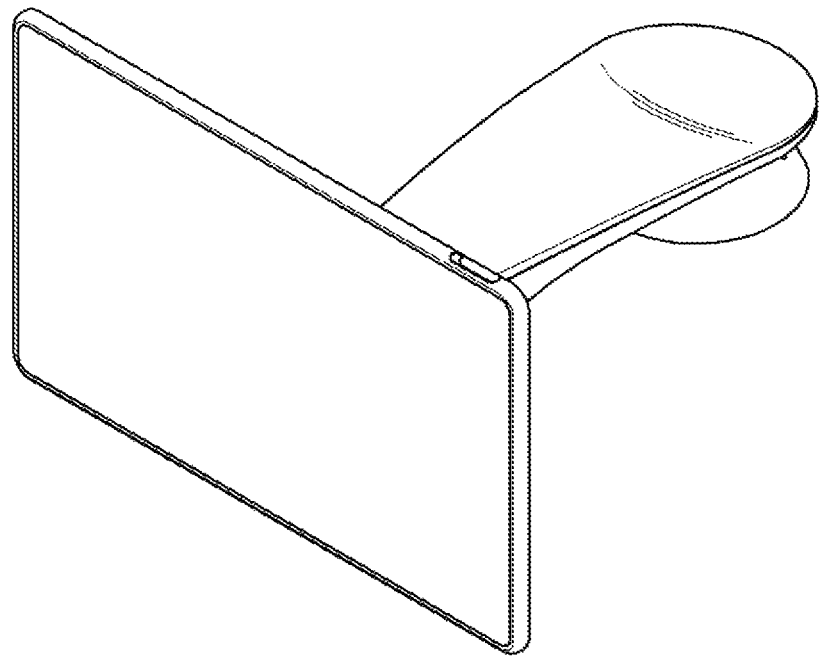

Referring to FIG. 25, the touch window may be applied to vehicle navigations as well as touch devices such as mobile terminals.

Figure 26:
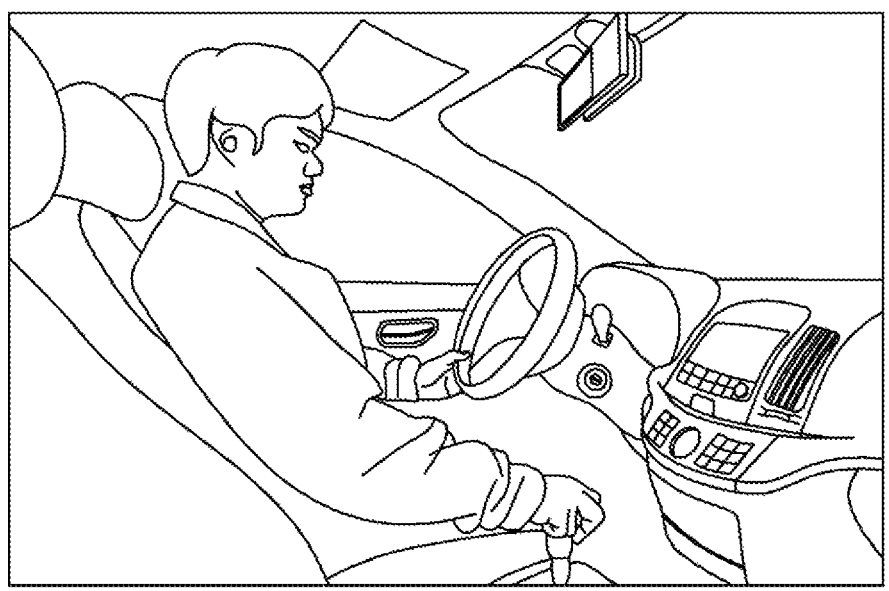

Also, referring to FIG. 26, such a touch window may be applied inside a vehicle. That is, the touch window may be applied to various portions at which the touch window is applicable within the vehicle. Thus, the touch window may be applied to dashboards as well as personal navigation displays (PNDs) to realize center information displays (CIDs). However, the embodiment may not be limited thereto, and thus the touch device may be used for various electronics.

Features, structures, and effects described in the above embodiments are incorporated into at least one embodiment of the present invention, but are not limited to only one embodiment. Moreover, features, structures, and effects exemplified in one embodiment can easily be combined and modified for another embodiment by those skilled in the art.

Therefore, these combinations and modifications should be construed as falling within the scope of the present invention. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of the present invention. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch window comprising:
a substrate;
a sensing electrode disposed on the substrate; and
a reflection prevention layer disposed on the sensing electrode,
wherein the sensing electrode comprises mesh lines defined by a plurality of sub electrodes crossing each other in a mesh shape and a mesh opening between the mesh lines,
each of the mesh line has a line width of 0.1 µm to 10 µm,
the sensing electrode and the reflection prevention layer have an inclined surface, and
wherein the reflection prevention layer comprises a first sub reflection prevention layer disposed on a first surface of the sensing electrode, a third sub reflection prevention layer disposed on a second surface opposite to the first surface, and a second sub reflection prevention layer disposed on a first side surface and a second side surface of the sensing electrode connecting the first surface to the second surface, the first surface of the sensing electrode being closer to the substrate than the second surface of the substrate,
wherein a width of the sensing electrode is from the first side surface to the second side surface, the width of the sensing electrode varies based on a distance from the second surface toward the first surface, and wherein the width of the sensing electrode continuously increase from the second surface toward the first surface,
wherein a side surface of the sensing electrode is inclined with respect to a surface of the substrate,
wherein a side surface of the reflection prevention layer is inclined with respect to the surface of the substrate, and
wherein an inclined angle of the side surface of the sensing electrode or the side surface of the reflection prevention layer is within a range of 20° to 70°.

2. The touch window according to claim 1, wherein the sensing electrode comprises:
a first sensing electrode disposed on one surface of the substrate; and
a second sensing electrode disposed on the other surface of the substrate,
wherein the first sensing electrode and the second sensing electrode extend in different directions.

3. The touch window according to claim 2, wherein, in the sensing electrode, one surface coming into contact with the first sub reflection prevention layer has a width greater than that of the other surface opposite to the one surface, which comes into contact with the third sub reflection prevention layer.

4. The touch window according to claim 1, wherein the first sub reflection prevention layer is disposed between the sensing electrode and the substrate,
the first sub reflection prevention layer, the second sub reflection prevention layer, and the third reflection prevention layer are connected to each other,
the first sub reflection prevention layer, the second sub reflection prevention layer, and the third reflection prevention layer are disposed on an entire surface of the sensing electrode, and
the second sub reflection prevention layer has an inclined angle corresponding to an inclined surface of the sensing electrode.

5. The touch window according to claim 1, wherein a lightness index (L*) of the reflection prevention layer is less than 40, and
a chromaticity index (b*) of the reflection prevention layer has a negative value.

6. The touch window according to claim 1, wherein a ratio of a thickness of the reflection prevention layer to a thickness of the sensing electrode is 1:25.

7. The touch window according to claim 1, wherein the sensing electrode includes at least one metal of Cr, Ni, Cu, Al, Ag, Mo, Au, Ti, and an alloy thereof.

8. The touch window according to claim 1, wherein the reflection prevention layer includes at least one of $Cu_2Se$, Cu—Pd, CuO, CrO, FeO, and $Ni_2O_3$.

9. A touch window comprising:
a substrate;
a base member disposed on the substrate and comprising an engraved pattern part, wherein a side surface of the engraved pattern part has an inclined surface;
a sensing electrode disposed in the engraved pattern part; and
a reflection prevention layer surrounding the sensing electrode,
wherein the engraved pattern part has a mesh shape crossing each other,
the sensing electrode comprises mesh lines defined by a plurality of sub electrodes crossing each other in a mesh shape and a mesh opening between the mesh lines,
each of the mesh line has a line width of 0.1 µm to 10 µm,
the pattern part has a height greater than that of each of the sensing electrode and the reflection prevention layer, which are disposed in the pattern part, and
wherein the reflection prevention layer comprises a first sub reflection prevention layer disposed on a bottom surface of the sensing electrode, a second sub reflection prevention layer disposed to come into entire contact with each of first side surface and second side surface of the sensing electrode, and a third sub reflection prevention layer disposed on a top surface of the sensing electrode, the bottom surface of the sensing electrode is closer to the substrate than the top surface of the sensing electrode,
wherein the second sub reflection prevention layer has an inclined surface that corresponds to the side surface of the pattern part,
wherein the first sub reflection prevention layer on the bottom surface of the sensing electrode is coupled to the second sub reflection prevention layer on the first side surface of the sensing electrode such that a first corner of the sensing electrode between the first sub reflection prevention layer and the second sub reflection prevention layer has an obtuse angle, and the third sub reflection prevention layer and the second sub reflection prevention layer are coupled to each other such that a second corner of the sensing electrode between the third sub reflection prevention layer and the second sub reflection prevention layer has an acute angle.

10. The touch window according to claim 9, wherein each of the sensing electrode and the reflection prevention layer comprises a plated layer.

11. The touch window according to claim 9, wherein the third sub reflection prevention layer has a width greater than that of the first sub reflection prevention layer.

12. The touch window according to claim 9, wherein each of the first to third sub reflection prevention layers comprises a blackening layer.

13. A touch device comprising:
a display panel; and
a touch window on the display panel,
wherein the display panel is an organic electroluminescence light emitting device,
wherein the display panel includes a first substrate and a second substrate,
wherein a thin film transistor and an organic light-emitting device are formed on the first substrate,
wherein the second substrate is an encapsulation substrate on the organic light-emitting device, and
wherein the touch window includes:
a substrate;
a sensing electrode disposed on the substrate; and
a reflection prevention layer disposed on the sensing electrode, wherein the sensing electrode comprises mesh lines defined by a plurality of sub electrodes crossing each other in a mesh shape and a mesh opening between the mesh lines, each of the mesh line has a line width of 0.1 μm to 10 μm, the sensing electrode and the reflection prevention layer have an inclined surface, and wherein the reflection prevention layer comprises a first sub reflection prevention layer disposed on a first surface of the sensing electrode, a third sub reflection prevention layer disposed on a second surface opposite to the first surface, and a second sub reflection prevention layer disposed on a first side surface and a second side surface of the sensing electrode connecting the first surface to the second surface, the first surface of the sensing electrode being closer to the substrate than the second surface of the substrate, wherein a width of the sensing electrode is from the first side surface to the second side surface, the width of the sensing electrode varies based on a distance from the second surface toward the first surface, and wherein the width of the sensing electrode continuously increase from the second surface toward the first surface, wherein a side surface of the sensing electrode is inclined with respect to a surface of the substrate, wherein a side surface of the reflection prevention layer is inclined with respect to the surface of the substrate, and wherein an inclined angle of the side surface of the sensing electrode or the side surface of the reflection prevention layer is within a range of 20° to 70°.

* * * * *